US012233555B2

(12) United States Patent
Hong

(10) Patent No.: US 12,233,555 B2
(45) Date of Patent: Feb. 25, 2025

(54) CLEANING ROBOT AND TASK PERFORMING METHOD THEREFOR

(71) Applicant: SAMSUNG ELECTRONICS CO., LTD., Suwon-si (KR)

(72) Inventor: Soonhyuk Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 361 days.

(21) Appl. No.: 17/264,085

(22) PCT Filed: Sep. 9, 2019

(86) PCT No.: PCT/KR2019/011635
§ 371 (c)(1),
(2) Date: Jan. 28, 2021

(87) PCT Pub. No.: WO2020/060091
PCT Pub. Date: Mar. 26, 2020

(65) Prior Publication Data
US 2021/0370511 A1  Dec. 2, 2021

(30) Foreign Application Priority Data

Sep. 20, 2018 (KR) .................. 10-2018-0113305
Nov. 8, 2018 (KR) .................. 10-2018-0136757

(51) Int. Cl.
 *B25J 9/16*  (2006.01)
 *B25J 11/00*  (2006.01)
(52) U.S. Cl.
 CPC ......... *B25J 9/1666* (2013.01); *B25J 11/0085* (2013.01)
(58) Field of Classification Search
 CPC ..... B25J 9/1666; B25J 11/0085; G01S 17/10; G01S 15/86; G01S 15/931;
(Continued)

(56) References Cited

U.S. PATENT DOCUMENTS 7,684,894 B2  3/2010  Sakai et al.
8,630,456 B2  1/2014  Asahara et al.
(Continued)

FOREIGN PATENT DOCUMENTS

JP  4555035 B2  9/2010
JP  5328979 B2  10/2013
(Continued)

OTHER PUBLICATIONS

International Search Report (PCT/ISA/210) dated Dec. 17, 2019 issued by the International Searching Authority for International Application No. PCT/KR2019/011635.
(Continued)

*Primary Examiner* — Khoi H Tran
*Assistant Examiner* — Nhi Q Bui
(74) *Attorney, Agent, or Firm* — Sughrue Mion, PLLC

(57) ABSTRACT

A task performing method for a cleaning robot, according to the disclosure, comprises the operations of: photographing an object in proximity to the cleaning robot includes obtaining recognition information of the object included in the photographed image, by applying the photographed image to a trained artificial intelligence model, obtaining, from among a plurality of sensors, additional information of the object by using a result obtained by detecting the object by at least one sensor selected, based on the recognition information of the object, and performing a task of the cleaning robot based on the additional information of the object. The trained artificial intelligence model, for example, a deep learning neural network model, in which a plurality of network nodes having weights are located in different layers so as to exchange data according to a convolution relationship, can be used, but is not limited to the aforementioned example.

14 Claims, 42 Drawing Sheets

(58) Field of Classification Search
CPC .............. A47L 2201/04; A47L 2201/06; A47L 9/2805; A47L 9/2826; A47L 9/2847; A47L 9/2889; A47L 11/4011; A47L 11/4061; G05D 2201/0203; G05D 2201/0215

See application file for complete search history.

(56) References Cited

U.S. PATENT DOCUMENTS

| | | | |
|---|---|---|---|
| 9,002,520 | B2 | 4/2015 | Hong et al. |
| 9,339,163 | B2 | 5/2016 | Noh et al. |
| 9,402,518 | B2 | 8/2016 | Burlutskiy |
| 9,511,494 | B2 | 12/2016 | Noh et al. |
| 2004/0075549 | A1* | 4/2004 | Haller ................ G06K 17/0022 340/522 |
| 2008/0079383 | A1* | 4/2008 | Nakamoto ........... G05D 1/0255 318/587 |
| 2012/0121132 | A1 | 5/2012 | Asahara et al. |
| 2013/0206177 | A1 | 8/2013 | Burlutskiy |
| 2015/0157182 | A1 | 6/2015 | Noh et al. |
| 2017/0156560 | A1 | 6/2017 | Jung et al. |
| 2017/0206418 | A1* | 7/2017 | Schnittman .......... G05D 1/0246 |
| 2018/0095058 | A1* | 4/2018 | McQuillen ........... G01N 29/024 |
| 2018/0210448 | A1* | 7/2018 | Lee ...................... G05D 1/0214 |
| 2019/0016332 | A1* | 1/2019 | Shin .................. B62D 15/0285 |
| 2019/0196495 | A1* | 6/2019 | Noh .................... G05D 1/0272 |
| 2019/0320867 | A1* | 10/2019 | Noh .......................... B25J 9/16 |

FOREIGN PATENT DOCUMENTS

| | | | | |
|---|---|---|---|---|
| KR | 10-0425695 | B1 | 4/2004 | |
| KR | 10-0773184 | B1 | 11/2007 | |
| KR | 10-0792041 | B1 | 1/2008 | |
| KR | 10-1049155 | B1 | 7/2011 | |
| KR | 10-1280908 | B1 | 7/2013 | |
| KR | 10-2013-0091879 | A | 8/2013 | |
| KR | 10-2015-0050159 | A | 5/2015 | |
| KR | 10-2016-0023428 | * | 3/2016 | ............... G06F 3/00 |
| KR | 10-2016-0023428 | A | 3/2016 | |
| KR | 10-1786516 | B1 | 10/2017 | |
| KR | 10-2018-0023302 | A | 3/2018 | |
| KR | 10-2018-0023303 | A | 3/2018 | |
| KR | 10-2018-0058511 | A | 6/2018 | |
| KR | 10-2018-0087769 | A | 8/2018 | |
| KR | 10-2093177 | B1 | 3/2020 | |
| WO | 02/23297 | A1 | 3/2002 | |
| WO | WO-2019060936 | A1 * | 4/2019 | ............. A61H 3/061 |

OTHER PUBLICATIONS

Written Opinion (PCT/ISA/237) dated Dec. 17, 2019 issued by the International Searching Authority for International Application No. PCT/KR2019/011635.
Communication dated Mar. 3, 2023 issued by the Korean Patent Office for Korean Patent Application No. 10-2018-0136757.
Communication dated Jun. 5, 2023 issued by the Korean Patent Office for Korean Patent Application No. 10-2018-0136757.
Office Action issued on Oct. 30, 2023 by the Korean Patent Office in corresponding KR Patent Application No. 10-2023-0119242.
Communication issued Jul. 26, 2024 by the Korean Intellectual Property Office in Korean Patent Application No. 10-2023-0119242.

* cited by examiner

FIG. 5A
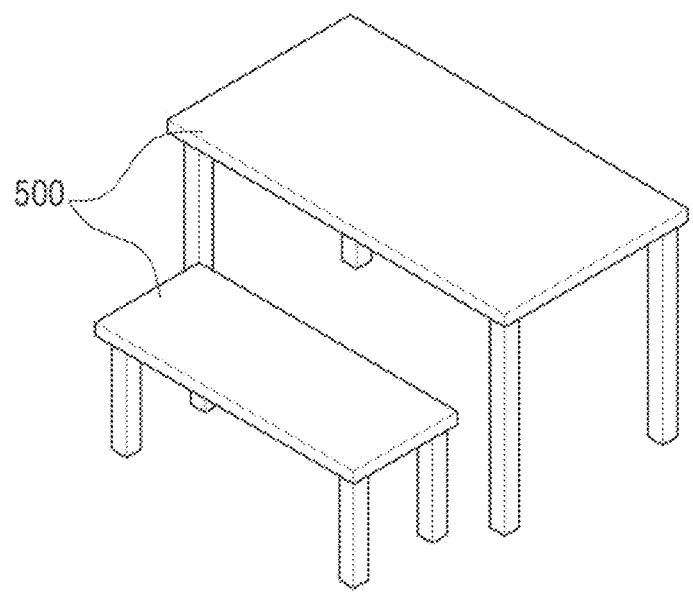
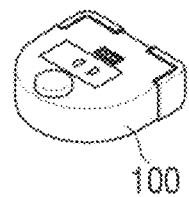

FIG. 26B
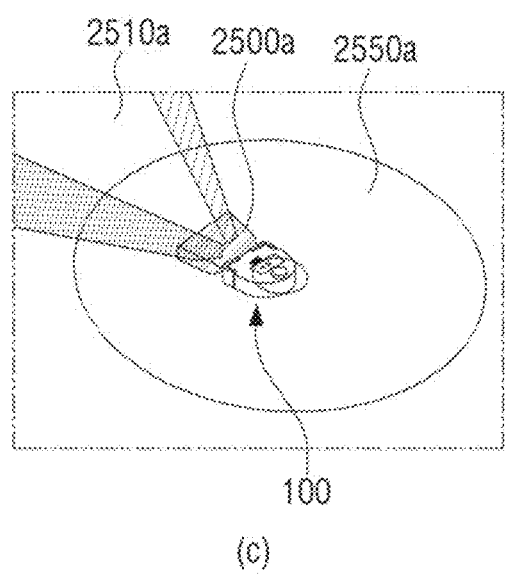
(c)
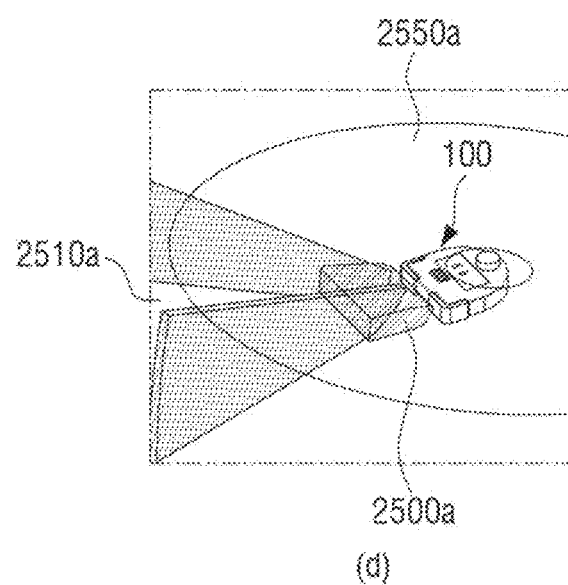
(d)

CLEANING ROBOT AND TASK PERFORMING METHOD THEREFOR

TECHNICAL FIELD

This disclosure relates to a cleaning robot and a task performing method of the cleaning robot. More specifically, the disclosure relates to a robot capable of providing a suitable task using information about a peripheral object (e.g., an obstacle) of the cleaning robot and a controlling method therefor.

BACKGROUND ART

According to the development of the robot technology, supply of a robot becomes popular to not only a specialized technical field or an industrial field requiring large labor power, but also a general household. A service robot for providing a housework service to a user, a cleaning robot, and a pet robot are widely used.

For a cleaning robot, it is very important to specifically identify information related to an object, such as a foreign substance, a structure, an obstacle, or the like, around the cleaning robot, and perform a task suitable for each object. A related-art cleaning robot has a limitation in obtaining specific information of an object due to a limited sensor combination. That is, the related-art cleaning robot may only perform an avoidance traverse of the same patterns depending only on a sensing capability of a sensor without information about what is a target object.

It is necessary to recognize an object around the cleaning robot, identify the most suitable task of the cleaning robot relative to the target object, and further differentiate traverse and avoidance methods.

DISCLOSURE

Technical Problem

The disclosure has been made to solve the above-described problems, and an object of the disclosure is to provide a cleaning robot capable of providing a service for performing a suitable task for a peripheral object using a plurality of sensors of the cleaning robot and a controlling method therefor.

Technical Solution

According to an embodiment, a task performing method for a cleaning robot includes photographing an object in proximity to the cleaning robot, obtaining recognition information of the object included in the photographed image, by applying the photographed image to a trained artificial intelligence model, obtaining, from among a plurality of sensors, additional information of the object by using a result obtained by detecting the object by at least one sensor selected, based on the recognition information of the object, and performing a task of the cleaning robot based on the additional information of the object.

According to an embodiment, a cleaning robot includes a sensing unit comprising a plurality of sensors, a camera, and a processor configured to control the camera to photograph an object in proximity to the cleaning robot, obtain recognition information of the object included in the photographed image, by applying the photographed image to a trained artificial intelligence model, obtain, from among a plurality of sensors, additional information of the object by using a result obtained by detecting the object by at least one sensor selected, based on the recognition information of the object, and perform a task of the cleaning robot based on the additional information of the object.

Effect of Invention

According to various embodiments as described above, a cleaning robot may provide a service for performing the most suitable task, such as removing or avoiding an object, in consideration of the recognition information and additional information, or the like, of the peripheral object.

According to various embodiments as described above, the cleaning robot may provide a semantic map representing an environment of a task area. Accordingly, the user receiving the semantic map may control the task of the cleaning robot by using a name of a place or an object, or the like, thereby improving the convenience of the user.

DESCRIPTION OF DRAWINGS

FIGS. 5A to 5C are diagrams illustrating obtaining additional information of the object as a result of detection through the LiDAR sensor by the cleaning robot according to an embodiment;

FIGS. 26A and 26B are diagrams illustrating a detection range of a cleaning robot according to an embodiment.

BEST MODE FOR CARRYING OUT THE INVENTION

Figure 1:
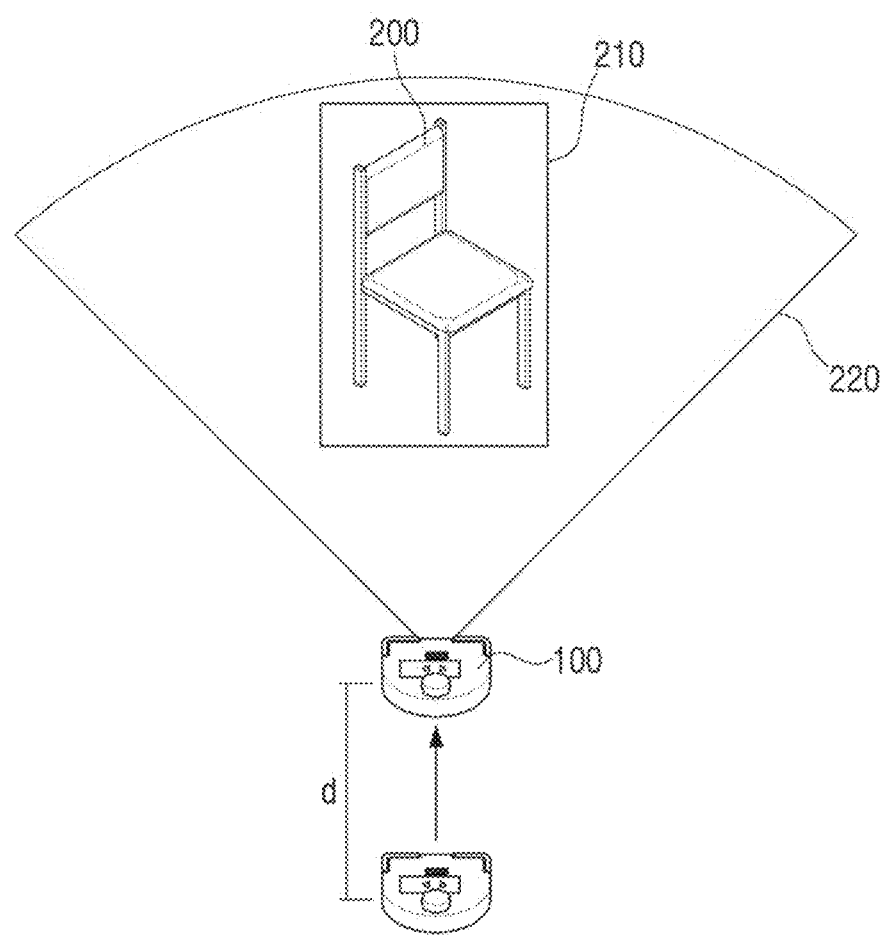
FIG. 1 is a diagram illustrating recognizing and detecting an obstacle by a cleaning robot according to an embodiment.

Various example embodiments of the disclosure will be described with reference to the accompanying drawings. However, it may be understood that the disclosure is not limited to the embodiments described hereinafter, but also includes various modifications, equivalents, and/or alternatives of these embodiments. In relation to explanation of the drawings, similar drawing reference numerals may be used for similar constituent elements.

In the description, the terms "first, second, and so forth" are used to describe diverse elements regardless of their order and/or importance and to discriminate one element from other elements, but are not limited to the corresponding elements. For example, a first user appliance and a second user appliance may indicate different user appliances regardless of their order or importance. For example, without departing from the scope as described herein, a first element may be referred to as a second element, or similarly, a second element may be referred to as a first element.

It is to be understood that an element (e.g., a first element) is "operatively or communicatively coupled with/to" another element (e.g., a second element) is that any such element may be directly connected to the other element or may be connected via another element (e.g., a third element). On the other hand, when an element (e.g., a first element) is "directly connected" or "directly accessed" to another element (e.g., a second element), it may be understood that there is no other element (e.g., a third element) between the other elements.

The terms used in the description are used to describe an embodiment, but may not intend to limit the scope of other embodiments. Unless otherwise defined specifically, a singular expression may encompass a plural expression. All terms (including technical and scientific terms) used in the description could be used as meanings commonly understood by those ordinary skilled in the art to which the disclosure belongs. The terms that are used in the disclosure and are defined in a general dictionary may be used as meanings that are identical or similar to the meanings of the terms from the context of the related art, and they are not interpreted ideally or excessively unless they have been clearly and specially defined. According to circumstances, even the terms defined in the embodiments of the disclosure may not be interpreted as excluding the embodiments of the disclosure.

Hereinafter, various embodiments will be described in detail with reference to the accompanying drawings. FIG. 1 is a diagram illustrating recognizing and detecting an obstacle by a cleaning robot according to an embodiment.

Referring to FIG. 1, a cleaning robot 100 may recognize an object 200 around the cleaning robot. The cleaning robot 100 is a device which provides a cleaning service to a user while moving and may be implemented with various types of electronic devices. For example, the cleaning robot 100 may be implemented According to various shapes such as a cylindrical shape, a cuboid shape, or the like, for various purposes, such as a home cleaning robot, a cleaning robot for cleaning a large building, a cleaning robot for an airport, or the like. According to an embodiment, the cleaning robot 100 may perform a task of simply removing foreign matters from a floor, but may also perform tasks to move an object according to a user command.

The cleaning robot 100 may photograph an image including an object 200 through the camera and may recognize the object by inputting the photographed image to the artificial intelligence model trained to recognize a thing. The artificial intelligence model may be included in the cleaning robot 100 or may be included in an external server (not shown). The artificial intelligence model may be trained according to a supervised learning scheme or an unsupervised learning scheme. For example, the artificial intelligence model may include a plurality of weighted network nodes, and the plurality of network nodes may be located at different depths (or layers) and may exchange data according to a convolution connection. For example, models such as deep neural network (DNN), recurrent neural network (RNN), and bidirectional recurrent deep neural network (BRDNN) may be used as data recognition models, but are not limited thereto.

When the cleaning robot 100 recognizes the object 200 as a chair, a sensor other than a red-green-blue (RGB) camera may be used to obtain more precise information about the object 200. More specifically, the cleaning robot 100 may be preset to preferentially use a light detection and ranging (LiDAR) sensor to obtain information about a position of legs and an interval between the legs when the object is a chair, and may be set to give a higher weight to the result through the LiDAR sensor among the result values through the plurality of sensors.

The cleaning robot 100 may launch a laser pulse 220 to sense the object 200 through the LiDAR sensor, which is used for precise information about the recognized object 200. More detailed description will be provided below.

The cleaning robot 100 may store the speed information at the first position, the object image information at the first position, and the speed information at the second position, and the image information at the second position of the cleaning robot. The cleaning robot 100 may identify a distance d between the first position and the second position based on the stored information, and may identify the distance from a specific position to the object 200.

The cleaning robot 100 may identify the task to be taken by the cleaning robot 100 ahead, with respect to the object 200 based on precise information, such as the position and interval of legs of a chair and distance information to the object 200 through an additional sensor such as the LiDAR sensor. For example, the cleaning robot 100 may control the progress speed and direction to perform a task of cleaning between the chair legs based on the information of the interval of the chair legs.

The cleaning robot 100 may identify an access-forbidden region or a bounding box 210 for the recognized object 200. In other words, the cleaning robot 100 may access only the access-forbidden region 210, if there is no sensing information other than information about the access-forbidden region 210 and object recognition through the RGB camera with respect to the object 200.

In the example above, a LiDAR sensor is used for an object which is a chair, but the embodiment is not limited thereto and various sensors may be used for various objects.

The cleaning robot 100 may identify a task to be performed according to the object differently according to the object recognition result. For example, when the cleaning robot 100 recognizes the object as a cereal, the cleaning robot 100 may remove the cereal, and when the object is a cushion, the cleaning robot 100 may push the cushion. When the object is recognized as a glass cup which is fragile, the cleaning robot 100 may slow speed down and perform precise recognition for complete avoidance. Furthermore, when the object is recognized as a dangerous object, the cleaning robot 100 may capture an image on the object and transmit the image to a user terminal device. Also, even when the recognized object is recognized as a dirty object, such as an excretion of a pet, it is possible to perform precision recognition for complete avoidance, and may transmit an image including an object to the user terminal device.

As described above, the cleaning robot 100 may obtain precise information on an object through a combination of the sensing results of the available at least one sensor to identify whether the proximate avoidance traverse or complete avoidance traverse will be performed. This will be described later.

Figure 2A:
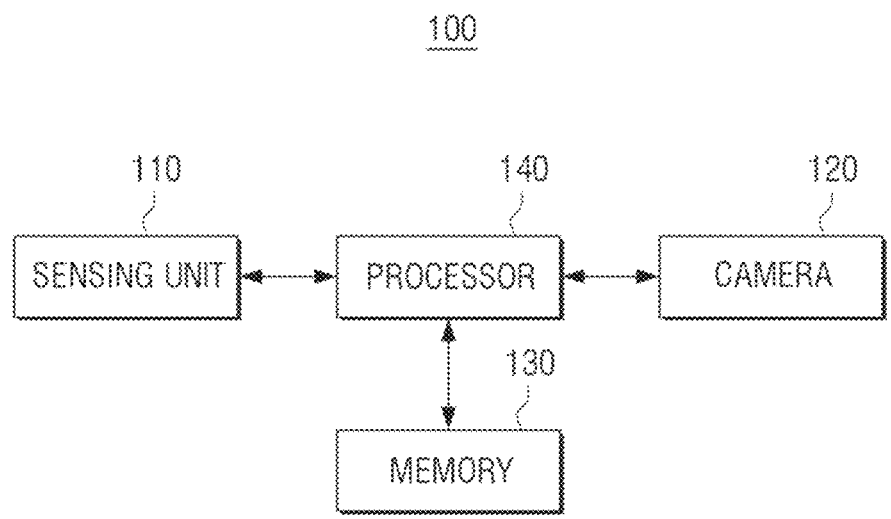
FIGS. 2A and 2B are simple block diagrams illustrating a configuration of the cleaning robot according to an embodiment.

FIG. 2A is a simple block diagram illustrating a configuration of the cleaning robot according to an embodiment.

Referring to FIG. 2A, the cleaning robot 100 may include a sensing unit 110, a camera 120, a memory 130, and a processor 140.

The sensing unit 110 may include various kinds of sensors. The sensing unit 110 may include a LiDAR sensor, an ultrasonic sensor, or the like. Each IR stereo sensor, a LADAR sensor, and ultrasonic sensors may be implemented as one sensor, but may be implemented as a separate sensor.

The IR stereo sensor may sense a three-dimensional (3D) shape and distance information of an object. In particular, the IR stereo sensor may obtain the 3D depth information of an object. However, the IR stereo sensor may have a disadvantage that sensing of a black color, a transparent color, or a metal is not possible.

The cleaning robot 100 may obtain a two-dimensional (2D) line shape and distance information for the object by using the LiDAR sensor. Through this, information about the space of the object and the distance information of the surrounding object may be obtained. However, the LiDAR sensor may have a disadvantage that sensing of a black color, a transparent color, or a metal is not possible.

The ultrasonic sensor may obtain distance information for an obstacle. The ultrasonic sensor may have a disadvantage in that a sensing range is relatively limited, but may have an advantage that sensing a black color, a transparent color, and metal is available.

The sensor 110 may include a dust sensor, an odor sensor, a laser sensor, an ultra-wideband (UWB) sensor, an image sensor, a sensor for detecting the vicinity such as an obstacles sensor, a gyro sensor, a global positioning system (GPS) sensor for detecting a moving state, or the like. The sensor for detecting the vicinity and the sensor for detecting a moving state of the cleaning robot may be implemented in a different configuration and may be implemented in one configuration. Each sensor of the sensor 110 may be implemented in a separate configuration. The sensor 110 may further include various kinds of sensors, and may not include some of the sensors shown in accordance with the task which the cleaning robot 100 is to perform.

A camera 120 is configured to capture an image around the cleaning robot 100 According to various aspects. The camera 120 may capture an image in front of the cleaning robot 100 through a red-green-blue (RGB) camera or capture an image about a direction which is different from a travel direction. The camera 120 may be independently provided in the cleaning robot 100 and may be a camera included in an object recognition sensor as a part of the object recognition sensor.

The camera 120 is configured to include a plurality of cameras. The camera 120 may be installed in an upper portion or a front portion of the cleaning robot 100 and may be installed in at least one of the upper portion or the front portion.

The memory 130 may store an image captured by the camera 120, moving state information and capturing direction information of the cleaning robot 100 at the time of capturing. The memory 130 may store navigation map information for a place for the cleaning robot 100 to perform a task. This is only one embodiment, and the memory 130 may store various programs, or the like, needed to operate the cleaning robot 100.

The memory 130 may store a plurality of application programs (or applications) running on the cleaning robot 100, data for operation of the cleaning robot 100, and instructions. At least some of the application programs may be downloaded from an external server via wireless communication. At least a part of the application program may be present on the cleaning robot 100 from the time of release for a basic function of the cleaning robot 100. The application program may be stored in the memory 130 and may be driven to perform an operation (or function) of the cleaning robot 100 by the processor 140.

As various embodiments, the memory 130 may store at least one instructions set to generate a navigation map for traverse of the cleaning robot 100 by using the result of sensing the task area by the processor 140 in which at least one sensor is arranged, obtain recognition information of the object by applying an image obtained by capturing an object by at least one camera to a trained artificial intelligence model, and generate a semantic map indicating an environment of the task area by mapping the object area included in a navigation map the recognition information of the object.

According to various embodiments, the memory 130 may store at least one instructions to capture an object around the cleaning robot and apply the captured image to the trained artificial intelligence model to obtain the recognition information of the object included in the image, detect an object using at least one sensor selected based on the obtained recognition information of the object, and obtain additional information for the object using the result detected by the at least one sensor.

The memory 130 may be implemented as a non-volatile memory, a volatile memory, a flash memory, a hard disk drive (HDD), a solid state drive (SSD), or the like. The memory 130 is accessed by the processor 140 and reading, writing, modifying, deleting, or updating of data by the processor 140 may be performed. In the disclosure, the term memory may include the memory 130, read-only memory (ROM) in the processor 140, random access memory (RAM), or a memory card (for example, a micro secure digital (SD) card, and a memory stick).

The processor 140 may control overall configurations of the cleaning robot 100. For example, the processor 140 may control the camera 120 to capture an image around the cleaning robot 100. The processor 140 may include a random access memory (RAM), and a read-only memory (ROM), and a system bus. The ROM stores an instruction set for booting the system. The CPU 141 copies the operating system stored in the memory 130 of the cleaning robot 100 to the RAM according to the instructions stored in the ROM, and executes the O/S to boot the system. When booting is completed, the CPU 141 copies various applications stored in the memory 130 to the RAM and executes various operations.

Figure 2B:
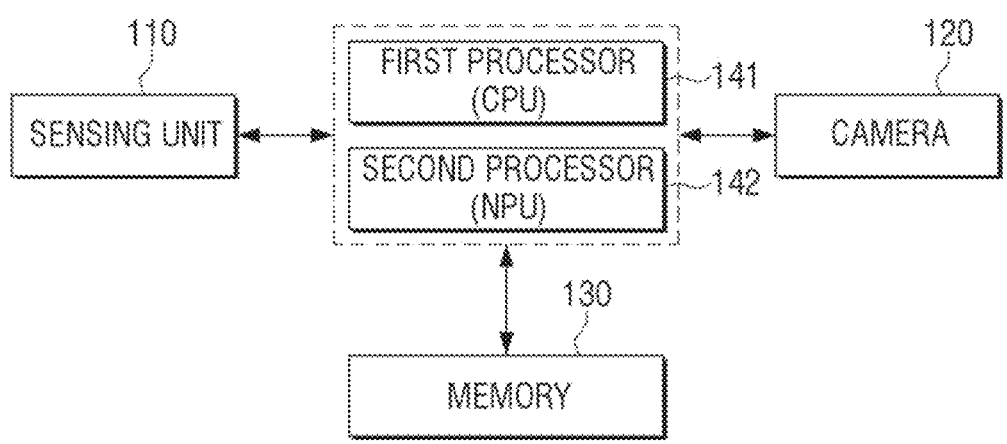

According to various embodiments, as illustrated in FIG. 2B, the cleaning robot 100 may include a plurality of processors 141, 142. The plurality of processors 141, 142 may include a central processing unit (CPU) 141 and a neural processing unit (NPU) 142. The NPU 142 may be an exclusive processor optimized to recognize an object using the trained AI model. The cleaning robot 100 may be implemented as a digital signal processor (DSP) for processing a digital signal, a microprocessor, and a time controller (TCON), a micro controller unit (MCU), a micro processing unit (MPU), an application processor (AP), a communication processor (CP), and an Advanced Reduced instruction set computing (RISC) Machine (ARM) processor or may be defined as a corresponding term. The processor 140 may be implemented in a system on chip (SoC) type or a large scale integration (LSI) type which a processing algorithm is built therein or in a field programmable gate array (FPGA) type.

According to various embodiments, the processor 140 may recognize an obstacle included in an image through an artificial intelligence model trained to recognize an object, such as an obstacle. The processor 140 may input an image including an obstacle to the artificial intelligence model and may obtain an output result including information on the obstacle type. The processor 140 may determine the size of different access-forbidden regions depending on the type of obstacle. The access-forbidden region may indicate an area including an obstacle, and a region which is not accessed by the cleaning robot 100 while performing a cleaning task. The artificial intelligence model may be stored in the memory 130 of the cleaning robot 100 as a type of an on-device and stored in an external server. The embodiment will be described in detail. Hereinafter, an embodiment of storing an artificial intelligence model in the cleaning robot 100 will be described.

According to various embodiments, the processor 140 may generate a second image in which the access-forbidden area relative to the recognized obstacle and the first image are overlapped. The processor 140, based on the information included in the second image, may recognize the locations of the structures and obstacles around the cleaning robot 100, and may determine the direction and speed to which the cleaning robot 100 is to move. The processor 140 may control the driver 110 to move the cleaning robot 100 according to the determined movement direction and speed.

According to various embodiments, the processor 140 may generate a first image in which a bottom surface is distinctively segmented from the captured image. At this time, the processor 140 may use an image division technique to segment the bottom surface.

According to various embodiments, the processor 140 may generate a navigation map for traverse of the cleaning robot 100 by using the result of sensing, by the sensing unit 110, the task area in which the object is arranged. The processor 140 may obtain the recognition information of the object by applying the image capturing the object by the camera 120 to the trained artificial intelligence model. The processor 140 may map the area of the object included in the navigation map with the recognition information of the object to generate a semantic map representing the environment of the task area. The processor 140 may perform the task of the cleaning robot based on the user's control command using the semantic map. Accordingly, the user provided with the semantic map may control the task of the cleaning robot 100 by using the recognition information of the object through various manners so as to greatly improve the convenience of the user.

According to various embodiments, the processor 140 may obtain recognition information of a place included in the task area by using the recognition information of the object. The processor 140 may generate a semantic map representing the environment of the task area by using the recognition information of a location included in the task area and the recognition information of the object. Accordingly, by referring to both the recognition information of each location and the recognition information of the object, the user provided with the semantic map may control the task to be performed by the cleaning robot 100 more accurately.

According to various embodiments, the processor 140 may map the recognition information of the object and the area of the object included in the navigation map based on at least one of the location of the object or the shape of the object according to the detection result of the object, and may generate a semantic map representing the environment of the task area. Accordingly, a semantic map may be provided by mapping the object to the correct position for the navigation map.

According to various embodiments, the processor 140 may obtain the recognition information of the object by applying the image of the object captured by the camera 120 to the trained artificial intelligence model located on an external server. According to the use of the artificial intelligence model, the recognition rate of an object may be greatly improved, and in particular, using an artificial intelligence model located on an external server, the usability of the artificial intelligence model may be improved by overcoming limited resources of the cleaning robot 100 and using more resources.

According to various embodiments, the processor 140 may identify a boundary of an object corresponding to an object in the navigation map. The processor 140 may map the recognition information and the area of the object determined by the boundary of the object to generate a semantic map representing the environment of the task area.

According to various embodiments, the processor 140 may obtain recognition information of the object by applying an image which captures an object by the camera 120 to a trained artificial intelligence model located at an external server.

According to various embodiments, the processor 140 may control the at least one sensor selected based on the identification information of the object to detect an object among the plurality of sensors included in the sensing unit 110. The processor 140 may obtain additional information for the object using the result detected by the at least one sensor.

According to various embodiments, the processor 140 may set a priority for a plurality of sensors according to recognition information of an object. The processor 140 may obtain additional information for an object using a result detected by at least one sensor according to a priority, among the plurality of sensors.

According to various embodiments, the processor 140 may control the camera 120 to photograph an object around the cleaning robot 100. The processor 140 may obtain the recognition information of the object included in the image by applying the captured image to the trained artificial intelligence model. The processor 140 may control the at least one sensor selected based on the recognition information of the object to detect an object among the plurality of sensors included in the sensing unit 110. The processor 140 may obtain additional information for the object using the result detected by the at least one sensor, and determine the task to be performed by the cleaning robot 100 with respect to the object based on the additional information for the object.

According to various embodiments, the processor 140 may set priority for a plurality of sensors included in the sensing unit 110 according to the identification information of the object. A priority of the plurality of sensors included in the sensing unit 110 may be set. The processor 140 may obtain additional information on the object using the result of detecting by at least one sensor according to the priority among the plurality of sensors.

According to various embodiment, when priority of the IR sensor is set to high among a plurality of sensors according to the recognition information of the object, a weight may be added to a result detected by the IR stereo sensor to obtain additional information about the object.

According to various embodiments, the processor 140 may identify the bounding box for the recognized object, and for a region in which the identification result of the bounding box and the object detection result through the IR stereo sensor does not match, the processor 140 may reduce a threshold value of the IR stereo sensor.

According to various embodiments, if the priority of the LiDAR sensor is set to high among the plurality of sensors included in the sensing unit 110 according to recognition information of the object, the processor 140 may obtain additional information of the object by adding a weight to a result detected by the LiDAR sensor.

According to various embodiments, the processor 140 may obtain additional information on the object by adding a weight to the result detected by the ultrasonic sensor, when the priority is set to the ultrasonic sensor is high, among the plurality of sensors included in the sensing unit 110 according to the identification information of the object.

According to various embodiments, when the priority of the ultrasonic sensor is set to high among the plurality of sensors included in the sensing unit 110 according to the recognition information of the object, the recognized object may be transparent or black.

According to various embodiments, the processor 140 may obtain recognition information of the object by applying the captured image to the trained artificial intelligence model located at an external server.

Figure 3:
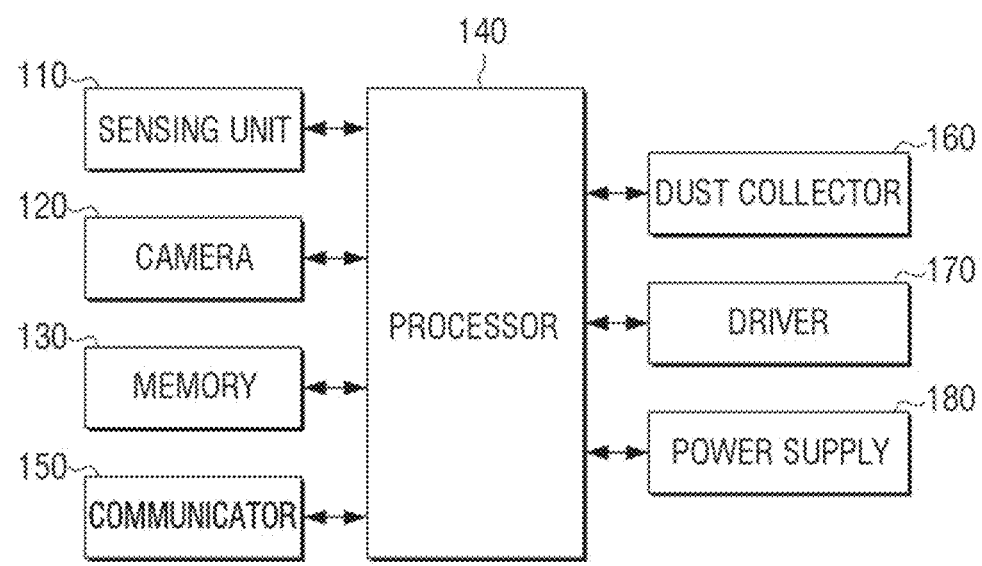
FIG. 3 is a detailed block diagram illustrating a configuration of the cleaning robot according to an embodiment.

FIG. 3 is a detailed block diagram illustrating a configuration of a cleaning robot according to an embodiment.

Referring to FIG. 3, the cleaning robot 100 may include the sensing unit 110, the camera 120, the memory 130, a communicator 150, a dust collector 160, a driver 170, a power supply 180, and the processor 140 electrically connected to the above configurations for controlling the configuration described above.

Since the sensing unit 110, the camera 120, the memory 130, and the processor 140 have already been described, the description thereof will be omitted.

The communicator 150 may transmit and receive data, control commands, and the like with an external device. For example, the communicator 150 may receive global area map information including location information for the space in which the cleaning robot 100 is operating from the external device. Also, the communicator 150 may transmit information to update the entire area map information to an external device. In another example, the communicator 150 may receive a signal to control the cleaning robot 100 transmitted by the user using a remote control device. At this time, the remote control device may be implemented According to various forms such as a remote controller, a mobile device, or the like.

The communicator 150 may transmit and receive data or the like with an external server (not shown). For example, when an artificial intelligence model is stored in an external server, the communicator 150 may transmit an image captured by the camera 120 to the external server and receive information on the object recognized (e.g., information for an obstacle) by using the artificial intelligence model stored on the external server. This is only one embodiment, and the communicator 150 may receive information about the movable area of the space to which the cleaning robot 100 is to perform a task from the external server.

The communicator 150 may use various wireless communication methods such as near field communication (NFC), wireless LAN (LAN), infrared (IR) communication, Zigbee communication, WiFi, Bluetooth, or the like.

The dust collector 160 is configured to collect dust. Specifically, the dust collector 160 may inhale and collect dust in the inhaled air. For example, the dust collector 160 may include a motor which passes air through a guide pipe leading to an outlet port from an inhale port, a filter for filtering dust in the inhaled air, and a dust container for collecting filtered dust, or the like.

The driver 170 may drive the cleaning robot 100. For example, the driver 170 may move the cleaning robot 100 to a position to perform a task by the control of the processor 140. The driver 170 may include at least one wheel in contact with a floor surface, a motor providing power to the wheel, and a driver controlling the motor. In another example, the driver 170 may implement an operation for performing a task. In the case of the object movement task, the driver 170 may include a motor for performing an operation of picking up an object, or the like.

The power supply 180 supplies power required for driving the cleaning robot 100. For example, the power supply 180 may be implemented as a battery capable of charging and discharging. The processor 140 may control the driver 110 to move to the charging station when the remaining power source of the cleaning robot 100 is dropped below a predetermined level, or when the task is completed. The charging method of the power supply 180 may include both contact and non-contact charging.

FIGS. 4A to 4D are diagrams illustrating obtaining additional information of an object as a result obtained by detecting through an infrared (IR) stereo sensor by the cleaning robot according to an embodiment.

The cleaning robot 100 may detect an object in the front through the IR stereo sensor. The cleaning robot 100 may recognize an object placed on the bottom of the front through the camera 120. The cleaning robot 100 may detect an object through the IR stereo sensor and obtain depth information of the object. For example, referring to FIG. 4A, the cleaning robot 100 may recognize and detect a plurality of objects 410, 420 in front of the object through the camera 120 and the IR stereo sensor, and obtain depth information for the objects 410, 420.

When the depth of the object is greater than a threshold value, the IR stereo sensor may detect the object, but if the depth of the object is less than the threshold value, the IR stereo sensor may not detect the object. For example, if the depth information of a carpet 420 is less than a predetermined threshold value, the cleaning robot 100 may not recognize the carpet 420, and may obtain only depth information 411 for a flowerpot 410 through the IR stereo sensor as shown in FIG. 4B.

The camera 120 may detect and recognize all the objects 410, 420 in the front regardless of the depth information of the object. The cleaning robot 100 may capture and recognize an image of all the flowerpot 410 and carpet 420 and may identify the bounding boxes 412, 422 for each object.

Figure 4A:
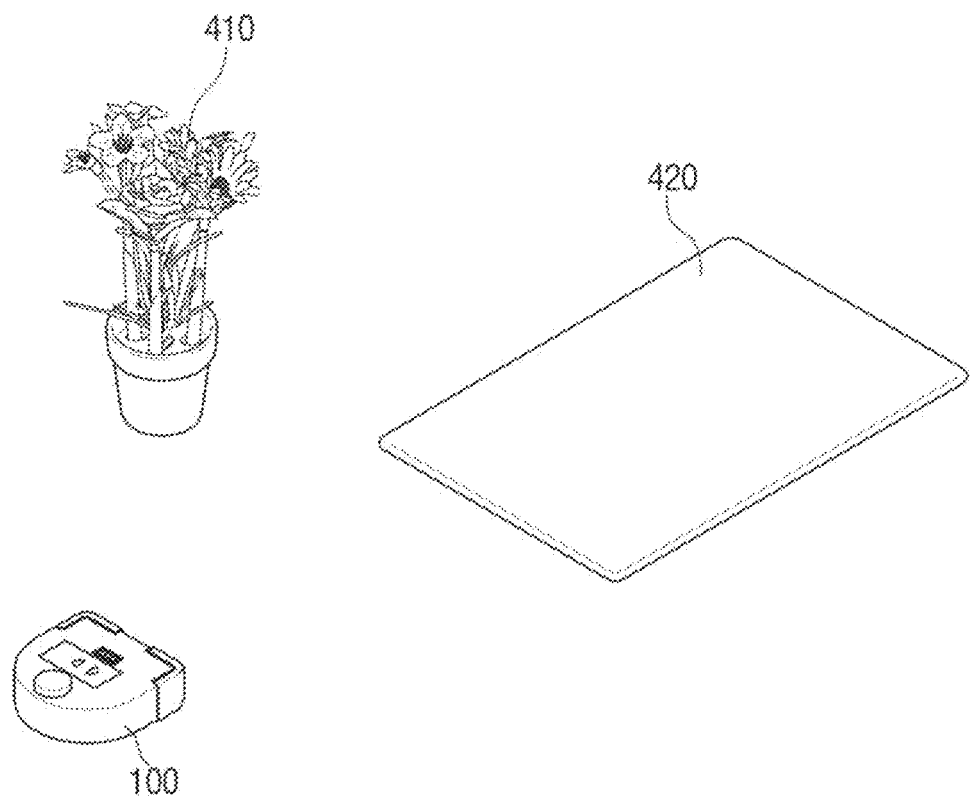
FIGS. 4A to 4D are diagrams illustrating obtaining additional information of an object as a result obtained by detecting through an infrared (IR) stereo sensor by the cleaning robot according to an embodiment.
Figure 4B:
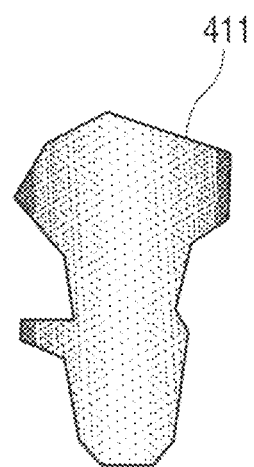
Figure 4C:
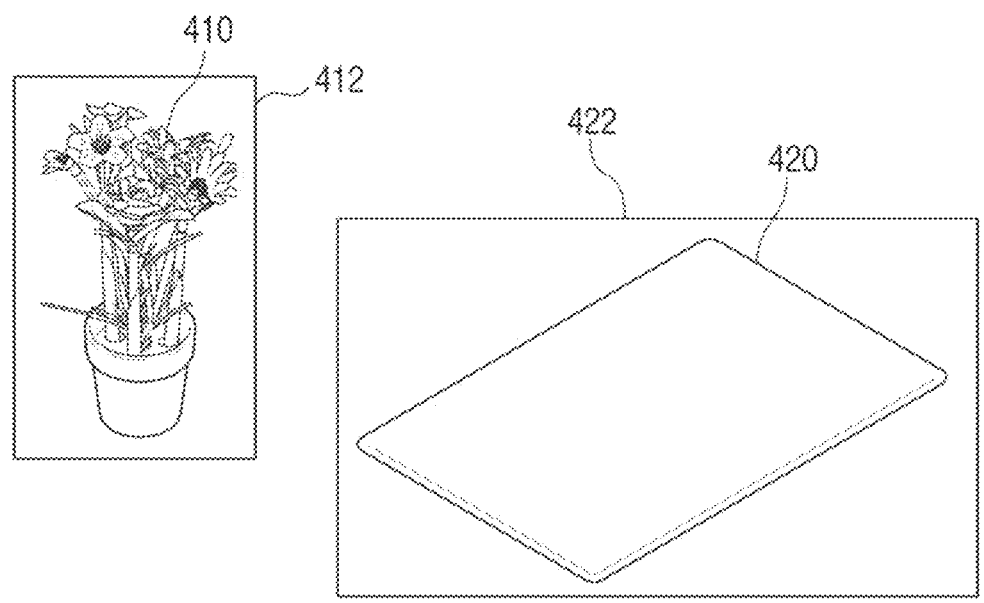
Figure 4D:
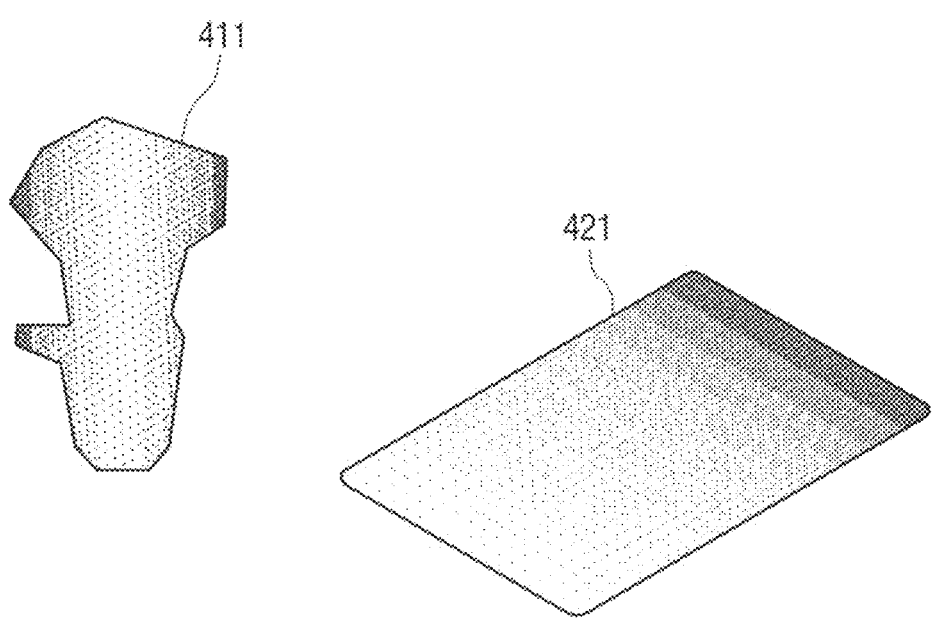

The cleaning robot 100 may set the threshold of the IR stereo sensor to be smaller when the object sensing result through the IR stereo sensor is different from the object recognition result through the camera as shown in FIGS. 4B and 4C. The cleaning robot 100 may reduce the threshold of the IR stereo sensor until the object recognition result through the camera 120 matches the result of the object detection through the IR stereo sensor, for example, until the number of the objects is identical. If the threshold of the IR stereo sensor becomes sufficiently low, the cleaning robot 100 may obtain depth information 421 of the carpet 420 as well as depth information 411 for the flowerpot 410 through the IR stereo sensor as the additional information, as shown in FIG. 4D.

According to one embodiment, the cleaning robot 100 may reduce the threshold of the IR stereo sensor only for regions corresponding to the bounding boxes 412, 422 obtained as in FIG. 4C. The cleaning robot 100 may compare the object recognition result with the object detection result through the IR stereo sensor and may reduce the threshold of the IR stereo sensor only for the different region 422. According to the embodiment above, the cleaning robot 100 may have an effect to enable the carpet 420 which the IR stereo sensor may not detect to be detectable and may still maintain the existing threshold value in detecting a new object.

Figure 5B:
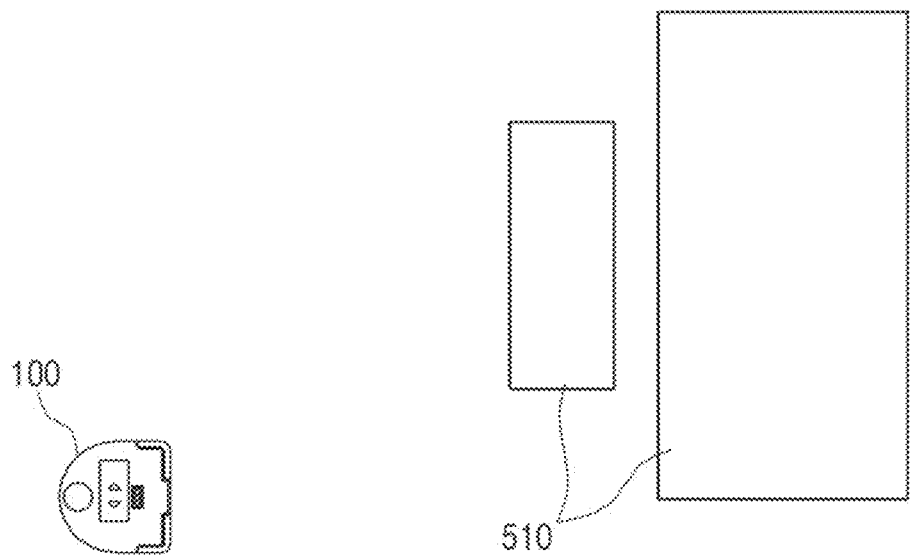
Figure 5C:
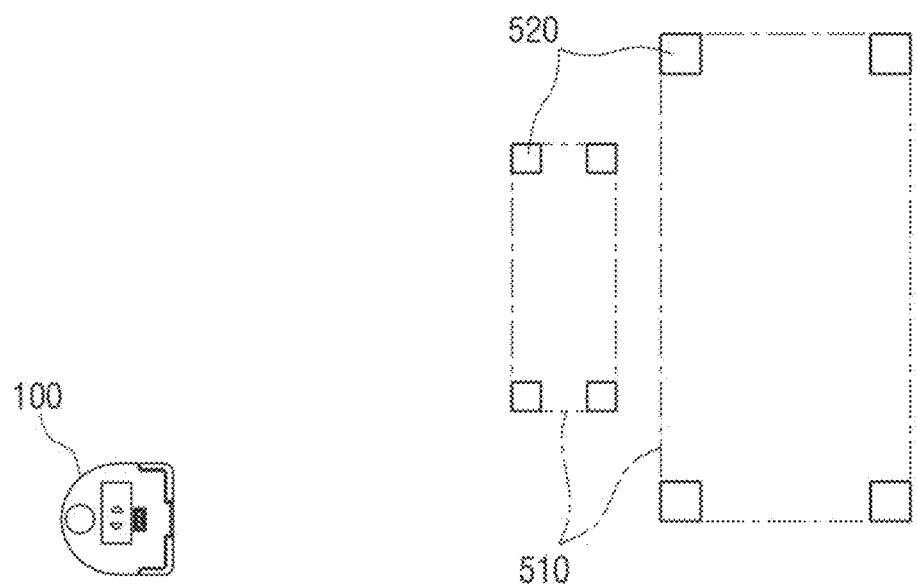

FIGS. 5A to 5C are diagrams illustrating obtaining additional information of the object as a result of detection through the LiDAR sensor by the cleaning robot according to an embodiment.

Referring to FIG. 5A, the cleaning robot 100 may capture and recognize an object 500 around the cleaning robot 100 first through the camera 120. As a result of object recognition, the cleaning robot 100 may determine that the recognized object 500 is a desk and a chair. When an object is a desk and a chair, the cleaning robot 100 may detect the LiDAR sensor as an additional sensor for obtaining additional information by setting a higher priority than other sensors.

FIG. 5B is a top view illustrating that the cleaning robot 100 recognizes the object 500 and determines a bounding box 510 for the object 500. As described above, the cleaning robot 100 may obtain the detailed information of the object 500 as additional information through the LiDAR sensor, which has a higher priority. The LiDAR sensor may obtain information about the legs of the object 500 as a laser pulse is launched in the direction of the object recognized by the cleaning robot 100.

For example, referring to FIG. 5C, the cleaning robot 100 may obtain information 520 about legs of the object 500 through the LiDAR sensor. The cleaning robot 100 may obtain information about position of legs, interval between legs, or the like, of the object 500 and may determine a suitable task.

Figure 6A:
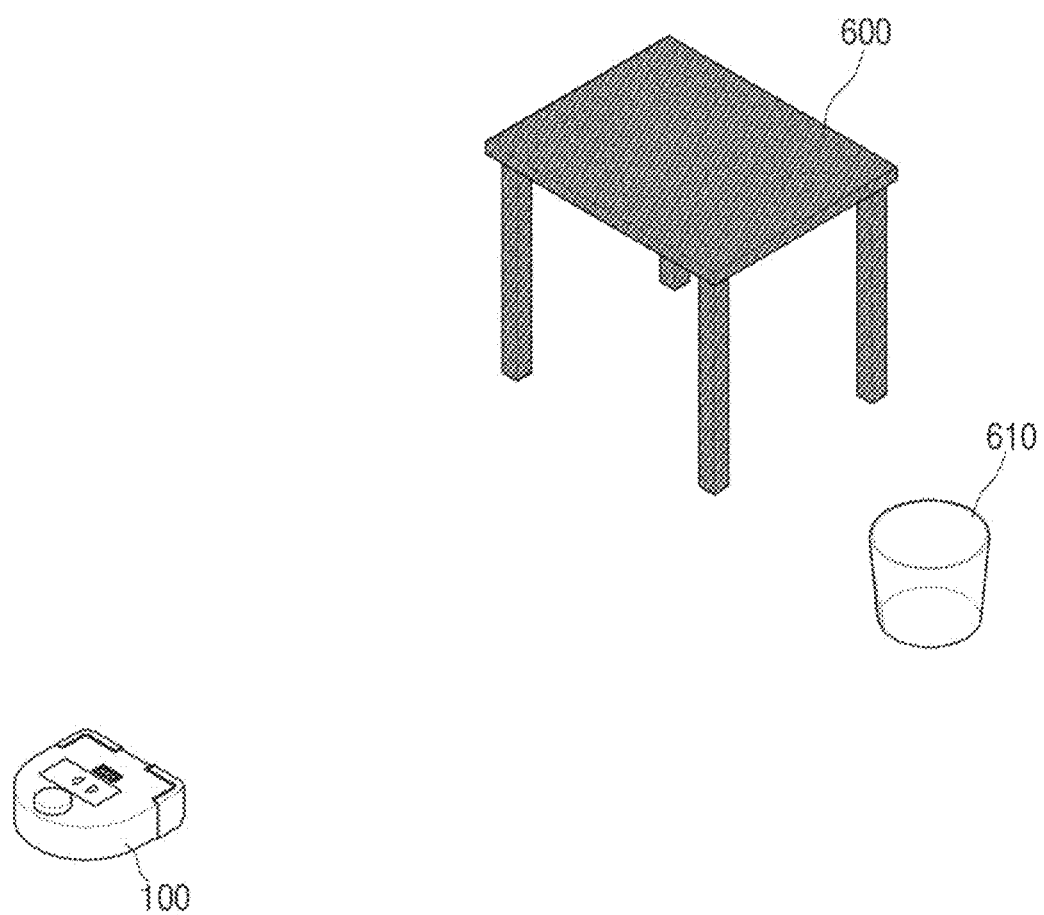
FIGS. 6A and 6B are diagrams illustrating obtaining additional information of the object as a result of detecting through an ultrasonic sensor by the cleaning robot according to an embodiment.
Figure 6B:
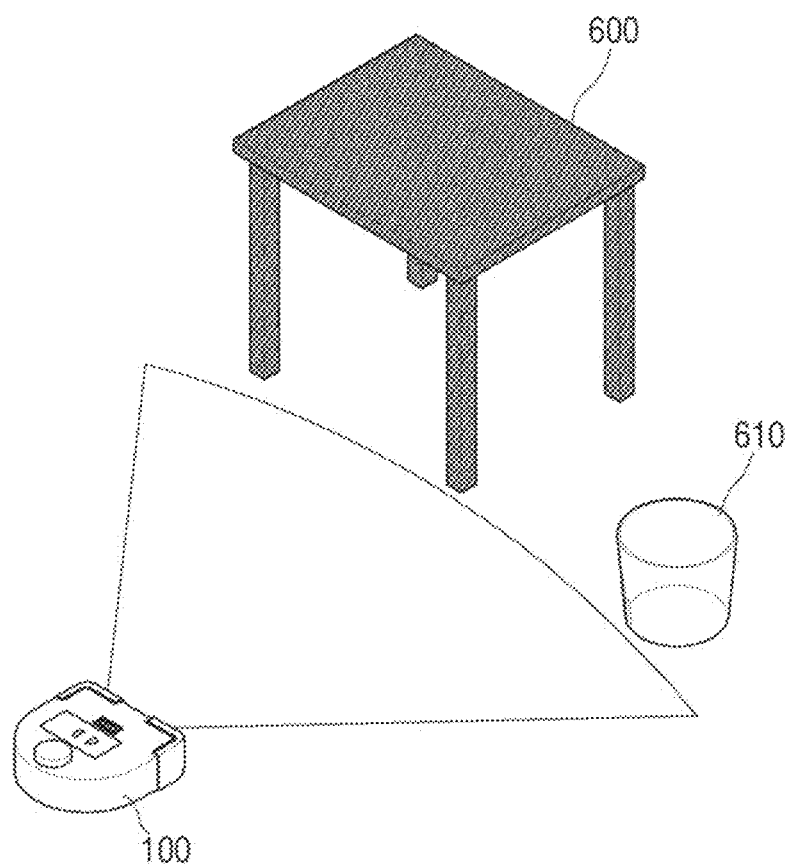

FIGS. 6A and 6B are diagrams illustrating obtaining additional information of the object as a result of detecting through an ultrasonic sensor by the cleaning robot according to an embodiment.

As illustrated in FIG. 6A, when an object is a black table 600 or a transparent glass cup 610, the IR stereo sensor or the LiDAR sensor may not detect an object. When the cleaning robot 100 recognizes that the object is the black table 600 and the glass cup 600 in the image obtained through the camera 120, the cleaning robot 100 may detect the image by setting a higher priority to the ultrasonic sensor than the IR stereo sensor or the LiDAR sensor.

Since the ultrasonic sensor has a limited sensing range, the cleaning robot 100 may rotate left and right to attempt to detect the object. For example, as shown in FIG. 6B, the cleaning robot 100 may obtain additional information about the object such as the position of the glass cup 610 and the leg position relative to the black table 600 through the ultrasonic wave by accessing within the distance that is detectable by the ultrasonic sensor.

Through the above embodiment, there is an effect that an object which is hard to be detected through the IR stereo sensor and the LiDAR sensor may be detected.

Figure 7A:
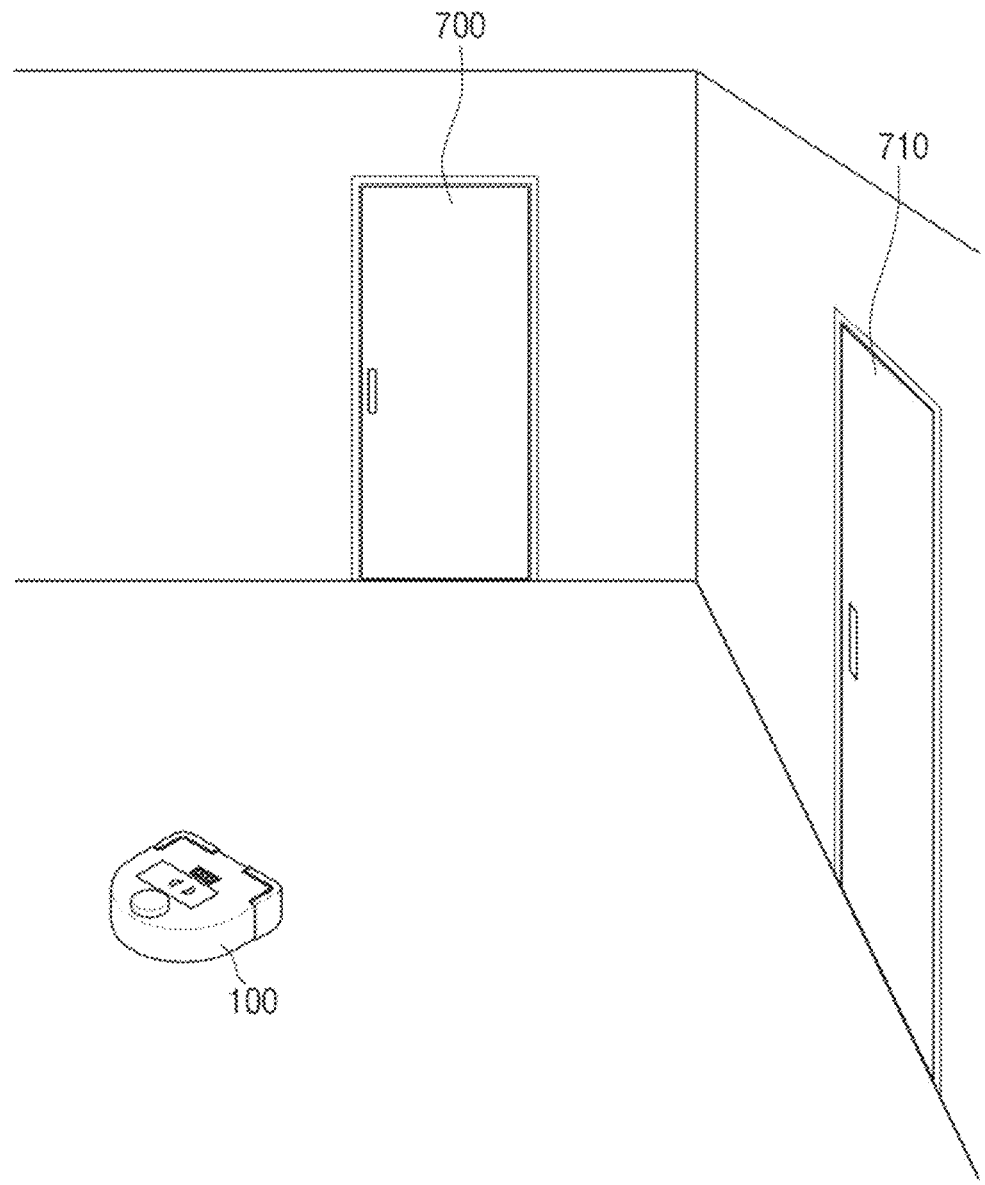
FIGS. 7A to 7C are diagrams illustrating grasping a structure in a house by the cleaning robot according to an embodiment.
Figure 7B:
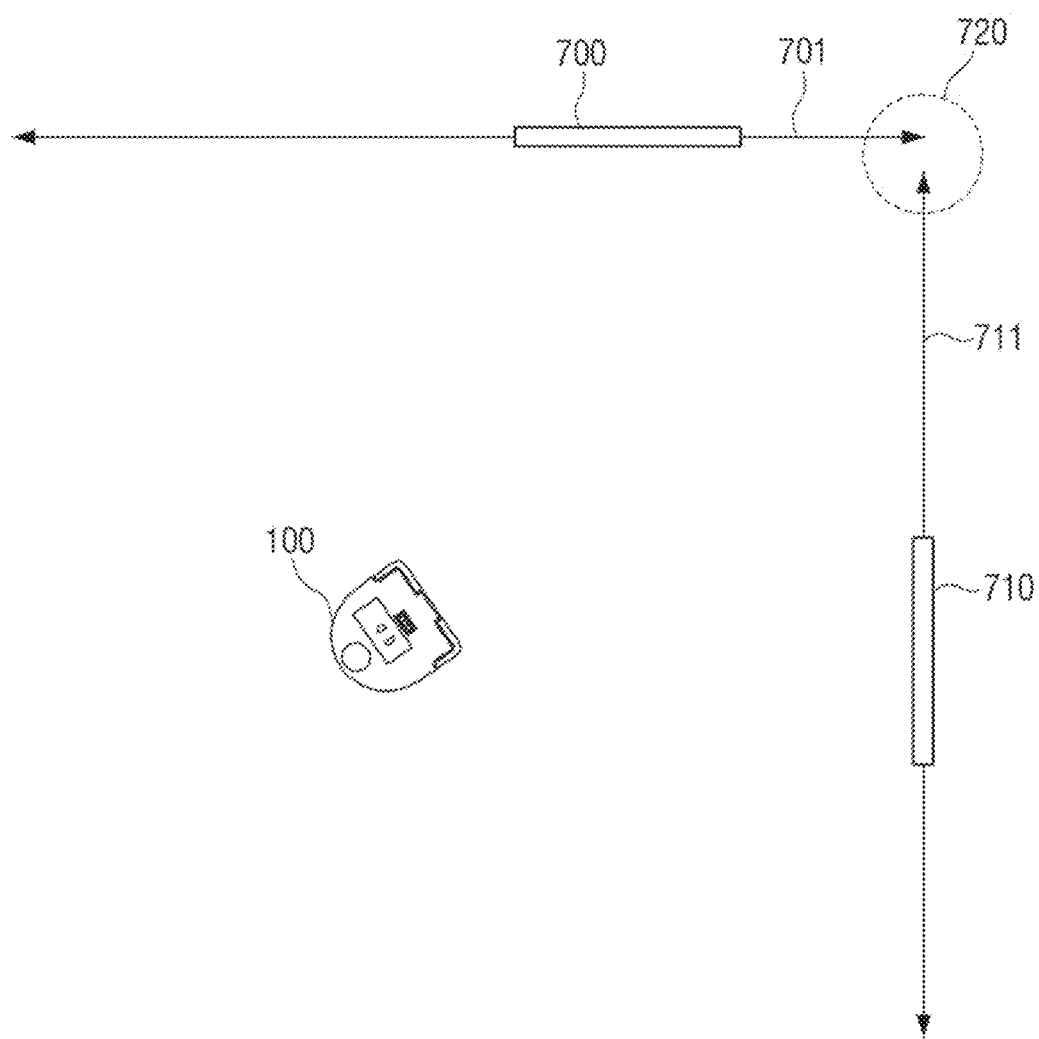

FIGS. 7A and 7B are diagrams illustrating grasping a structure in a house by the cleaning robot according to an embodiment.

Referring to FIG. 7A, the cleaning robot 100 may recognize the object as a door 700, 710 by using the result of sensing an object by at least one of the camera 120 or a plurality of sensors. A method of recognizing the object as a door by the cleaning robot 100 may be recognizing through the result of inputting the image including the door 700, 710 into the artificial intelligence model, When the detected object is a door, the cleaning robot 100 may determine a structure of the task area (e.g., structure in a house) through the door. For example, the cleaning robot 100 may determine both sides in the direction parallel with the door 700, 710 as a wall, if there is no specific circumstance.

Referring to FIG. 7B, the cleaning robot 100 may determine both directions that are horizontal with the recognized first door 700 as a first wall 701 and may determine both directions that are horizontal with a recognized second door 710 as a second wall 711. When there is a crossing portion 720 of the inferred first wall 701 and the inferred second wall 711, the cleaning robot may determine the crossing portion 720 as an edge portion in the house.

Figure 7C:
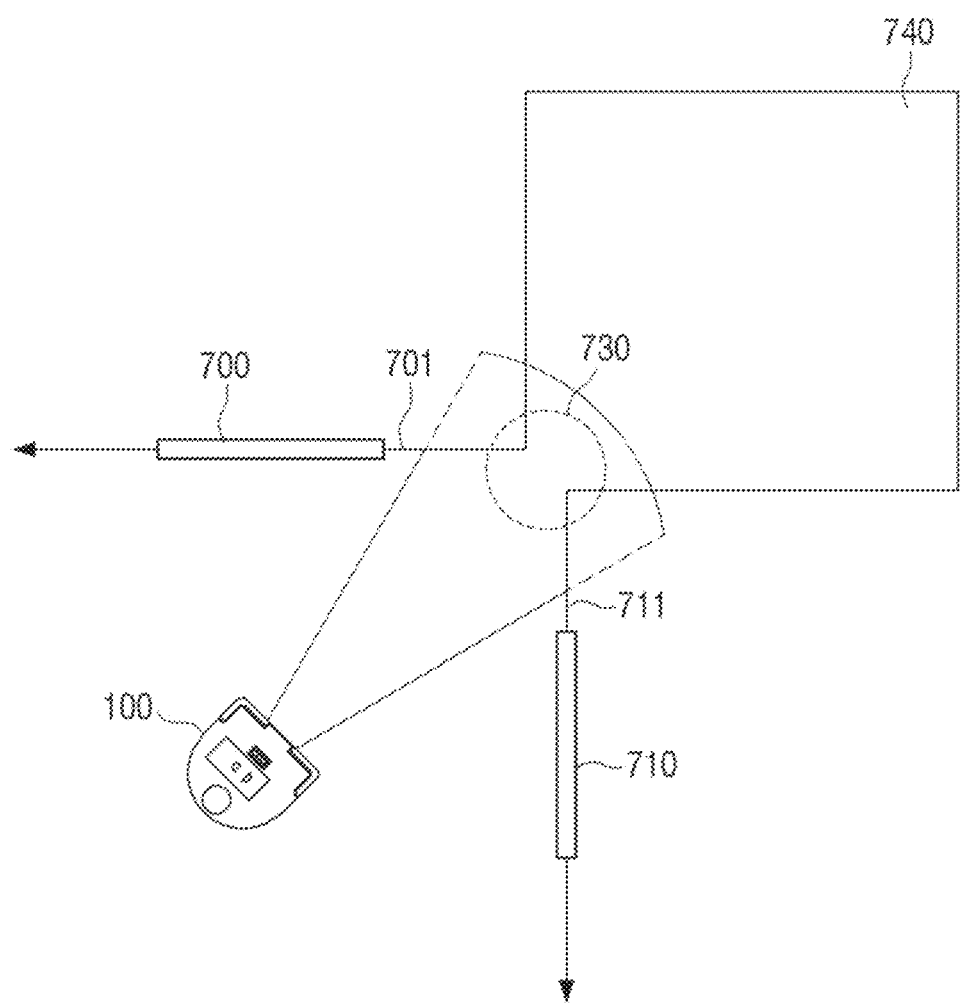

Referring to FIG. 7C, the cleaning robot 100 may detect an empty space in a portion 730 in which crossing of the inferred first wall 701 and the inferred second wall 711 is expected.

For example, if a separate region is present with the expected crossing portion as a passage, the cleaning robot 100 may detect a separate region 740 by using the LiDAR sensor. According to the detection result, the cleaning robot 100 may determine that there is an empty space between the first wall 701 and the second wall 711, and may include a separate region 740 with the empty space of the structure of the task area as a passage.

According to an embodiment, when the cleaning robot 100 recognizes the object as a door, there is an effect that the structure of the task area may be identified without simply ending with the object recognition. According to the above-described embodiment, the cleaning robot 100 may generate a semantic map which reflects the structure of the task area to the navigation map.

Figure 8A:
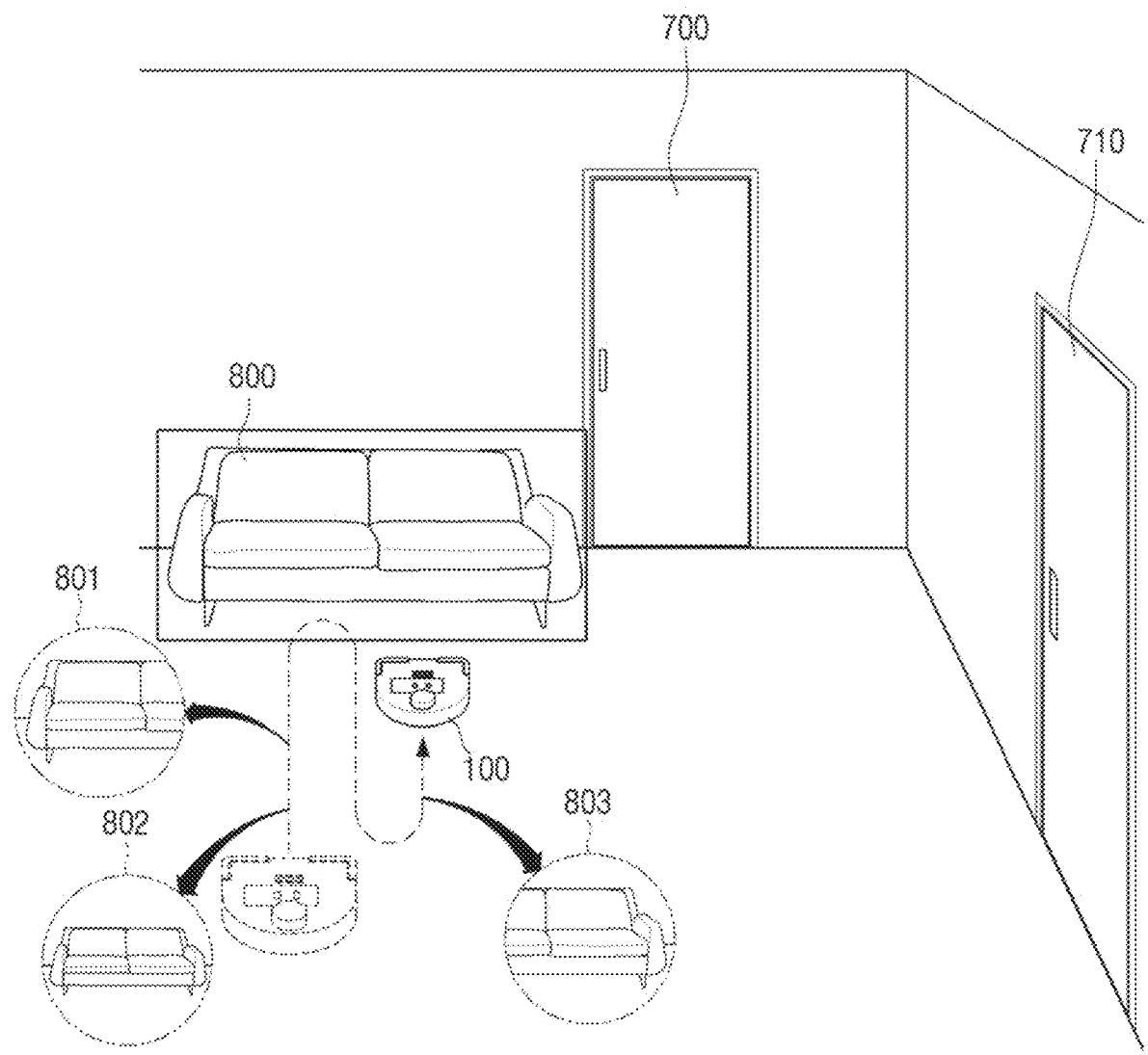
FIGS. 8A and 8B are diagrams illustrating generating a semantic map based on the structure in a house and additional information of the object by the cleaning robot according to an embodiment.
Figure 8B:
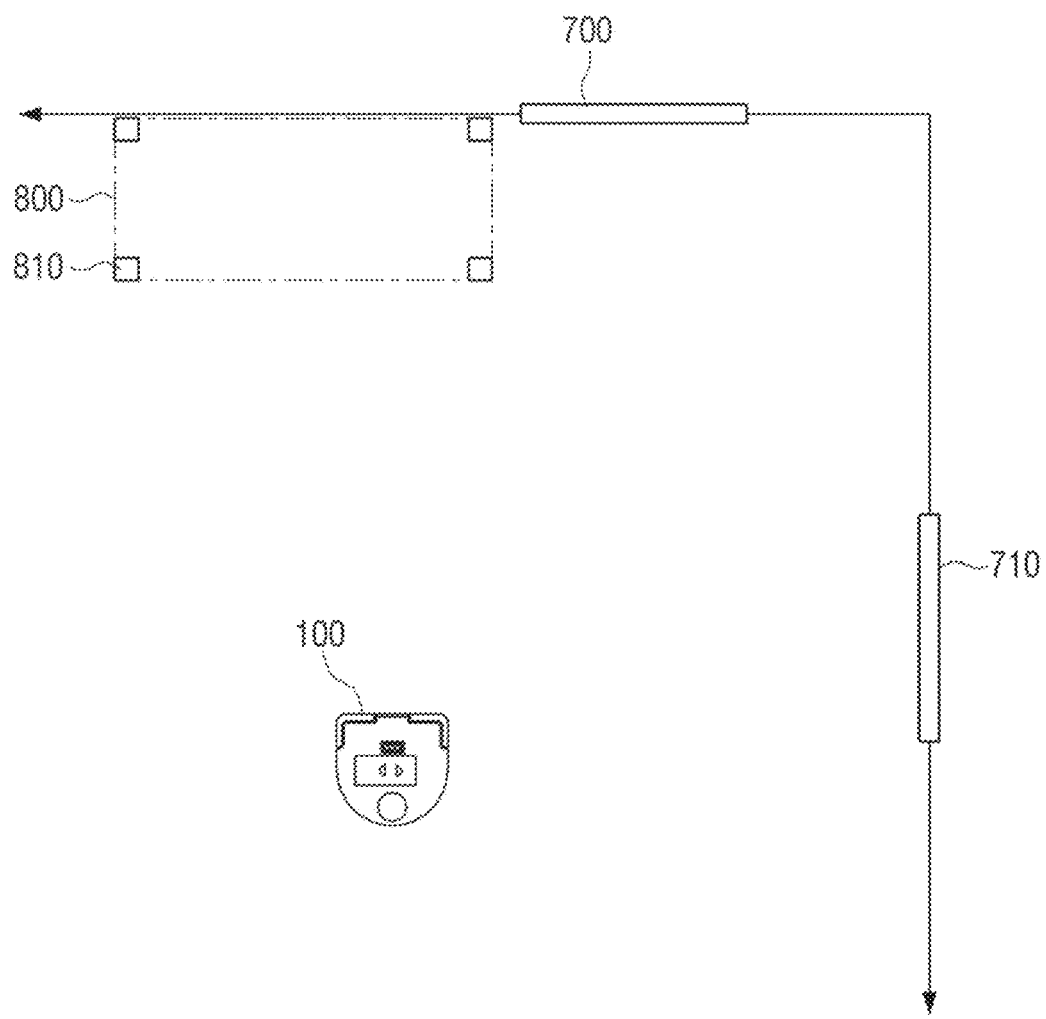

FIGS. 8A and 8B are diagrams illustrating generating a semantic map based on the structure in a house and additional information of the object by the cleaning robot according to an embodiment.

Referring to FIG. 8A, the cleaning robot 100 may recognize an object in the house as a door 700, 710 and a sofa 800, respectively.

As described in FIGS. 7A and 7B, the cleaning robot 100 may identify a structure of a task area (e.g., a wall in the house) through the door 700, 710. The cleaning robot 100 may recognize the sofa 800 while traversing toward the object. For example, referring to FIG. 8A, the cleaning robot 100 may obtain a plurality of images 801-803 capturing the object as a result detected by at least one of the camera 120 or a plurality of sensors while traversing toward the object. For example, the cleaning robot 100 may obtain images 801-803 by capturing an object at a predetermined distance (e.g., 20 cm to 40 cm) or a predetermined period (e.g., 0.5 to 2 seconds) and store the images in the memory 130.

When the cleaning robot 100 stops the operation or returns to a charging station for charging, the cleaning robot 100 may obtain the recognition information of the object from the images 801 to 803 stored in the memory 130. The cleaning robot 100 may apply the stored images 801 to 803 to the artificial intelligence model to obtain the recognition information of the object.

If the additionally recognized object is the sofa 800, that is, a structure other than an obstacle or a foreign substance, the cleaning robot 100 may generate a semantic map by adding the additional recognized object to a navigation map for the task area.

For example, with reference to FIG. 8B, the cleaning robot 100 may generate a semantic map based on the structure of the task area inferred through the sofa leg information 810, and doors 700, 710, that are further obtained through the LiDAR sensor, or the like, relative to the sofa 800 which is a structure.

Figure 9A:
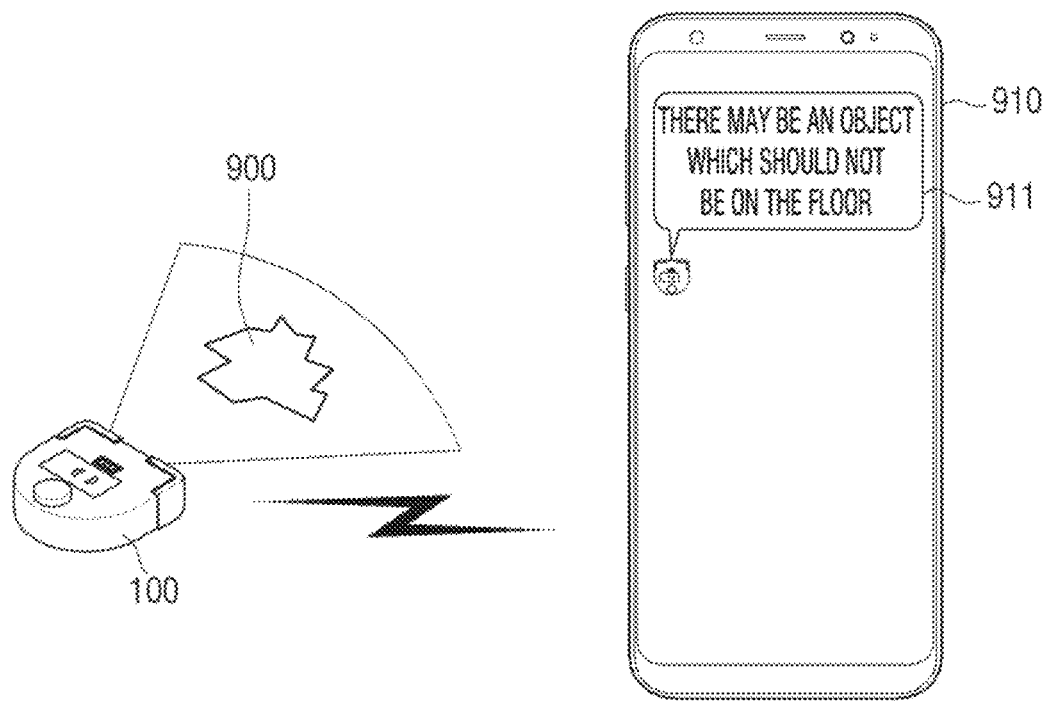
FIGS. 9A and 9B are diagrams illustrating noticing a dangerous material present on a floor by the cleaning robot to a user according to an embodiment.
Figure 9B:
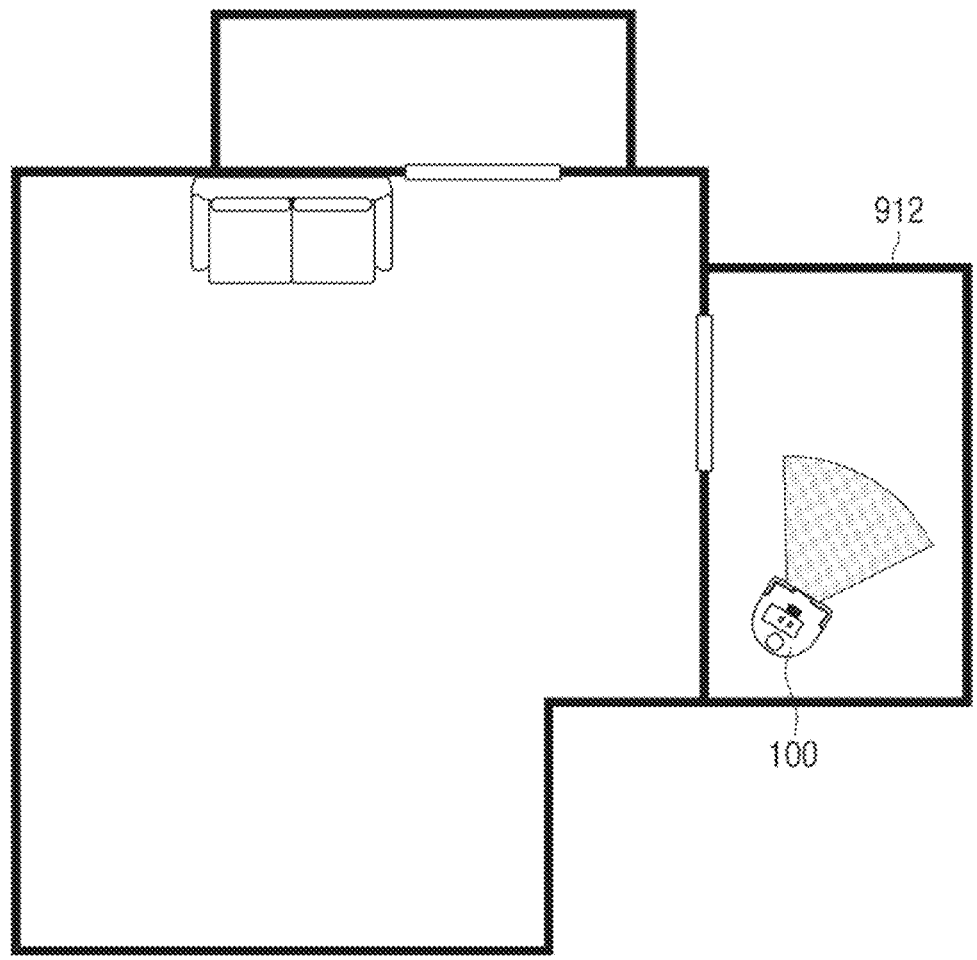

FIGS. 9A and 9B are diagrams illustrating noticing a dangerous material present on a floor by the cleaning robot to a user according to an embodiment.

Referring to FIG. 9A, the cleaning robot 100 may recognize an object present in the floor as a broken glass cup 900. The cleaning robot 100 may input an image including an object 900 to the artificial intelligence model to perform object recognition, and may recognize the corresponding object as a broken glass cup.

The cleaning robot 100 may inform the user that a dangerous object is in the floor. The cleaning robot 100 may transmit the warning data to a user terminal device 910 so that a notification phrase 911 such as an "there may be an object which should not be on the floor" is displayed on the user terminal device 910. Alternatively, the cleaning robot 100 may transmit the warning data to the user terminal device 910 so that a notification phrase including the recognition information of the object that is a result of recognizing the object is displayed. For example, when an object is recognized as a glass cup, the cleaning robot 100 may transmit the warning data to the user terminal device 910 so that a notification phrase such as "there is a glass cup on the floor" is displayed.

Alternatively, the cleaning robot 100 may transmit a navigation map or a semantic map generated according to the method described in FIGS. 7A to 8B to the user terminal device 910. The user terminal device 910 may display a semantic map or a navigation map on the user terminal device 910 and may also display location information of a dangerous object received from the cleaning robot 100.

For example, as shown in FIG. 9B, the user terminal device 910 may display a user interface (UI) 912 for the navigation map received from the cleaning robot 100, and may display the location in which the cleaning robot 100 is currently detecting a dangerous object together in the UI.

Through the above embodiment, there is an effect that information about whether a currently dangerous object is on a floor and information about a location where a dangerous object is present may be known easily.

Figure 10:
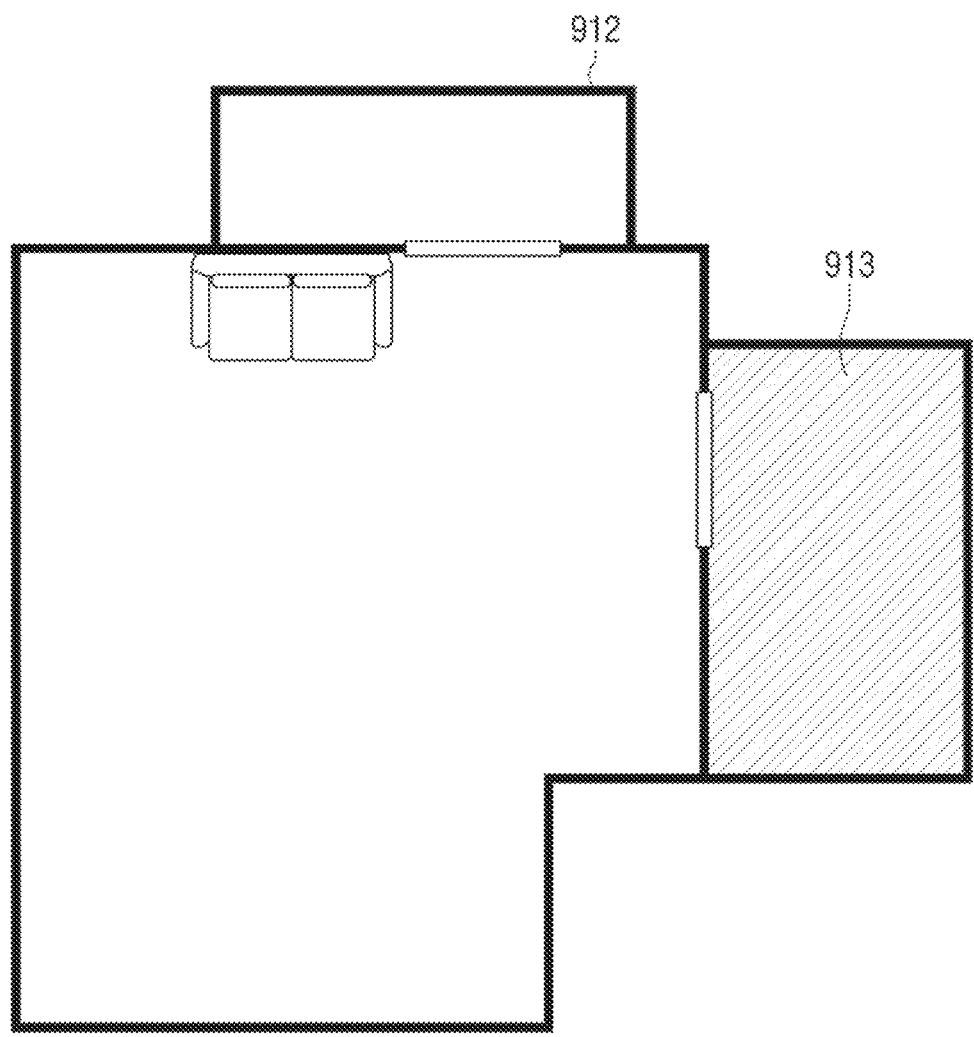
FIG. 10 is a diagram illustrating designating an area not to be cleaned by the cleaning robot according to an embodiment.

FIG. 10 is a diagram illustrating designating an area not to be cleaned by the cleaning robot according to an embodiment.

As described above, the user terminal device 910 may receive a navigation map from the cleaning robot 100 and may display the UI 912 thereabout.

The user may designate an area 913 in which the cleaning robot 100 will not be clean. For example, if an access limit is required to a specific area 913 on the navigation map (e.g., a baby is sleeping), the user may give a command to the cleaning robot 100 not to clean through interaction (e.g., touch, clicking) on the corresponding area 913 on the UI displayed on the user terminal device 910.

The cleaning robot 100 may perform a task to automatically avoid the specific area 913 where an access limit is required without receiving a user's command. For example, the cleaning robot 100 may recognize an object (e.g., a sleeping baby) included in the specific area 913 by using the artificial intelligence model before entering the specific area 913. As a result of the recognition of the object, if it is identified that an access limit is required for the specific area 913, the cleaning robot 100 may perform a task while traversing by avoiding the specific area 913.

Figure 11A:
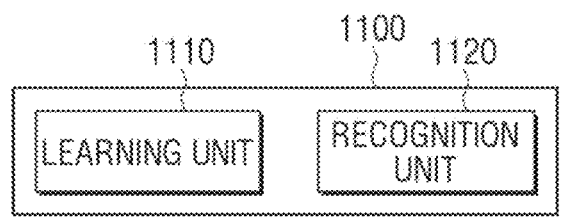
FIGS. 11A and 11B are block diagrams illustrating a learning unit and a recognition unit according to various embodiments.
Figure 11B:
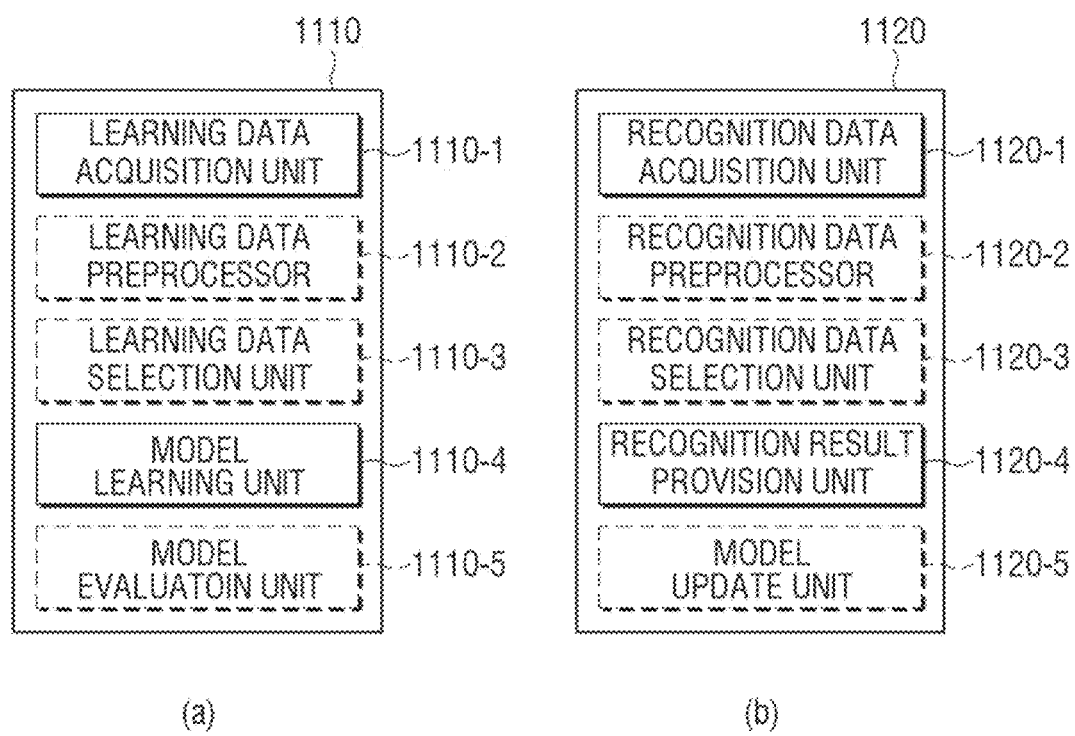

FIGS. 11A and 11B are block diagrams illustrating a learning unit and a recognition unit according to various embodiments.

Referring to FIG. 11A, a processor 1100 may implement at least one of a learning unit 1110 and a recognition unit 1120. The processor 1100 of FIG. 11A may correspond to the processor 140 of the robot cleaner 100 as illustrated in FIG. 2 or a processor of an external server (not shown) communicable with the cleaning robot 100.

The learning unit 1110 may generate or train a recognition model to identify a predetermined situation. The learning unit 1110 may generate a recognition model having an identification criterion using the collected learning data.

For example, the learning unit 1110 may generate, train, or update an object recognition model having a criterion of identifying what is an object included in an image using an image including an object as learning data.

In another example, the learning unit 1110 may generate, train, or update a peripheral information recognition model having a criterion for identifying various additional information around the object included in the image using peripheral information included in a screen including an object as learning data.

As another example, the learning unit 1110 may generate, train, or update the obstacles recognition model having a criterion to identify obstacles included in an image using an image captured by a camera as learning data.

The recognition unit 1120 may estimate a recognition subject included in predetermined data using predetermined data as input data of a trained recognition model.

In an example, the recognition unit 1120 may obtain (or estimate, predict) object information about an object included in an object region using an object region (or image) including an object as input data as a trained recognition model.

In another example, the recognition unit 1120 may estimate (or determine, infer) a search category for providing a search result by applying object information to the trained recognition model. The search result may be plural according to priorities.

At least a portion of the learning unit 1110 and at least a portion of the recognition unit 1120 may be implemented as software modules or at least one hardware chip form and mounted in an electronic device. For example, at least one of the learning unit 1110 and the recognition unit 1120 may be manufactured in the form of an exclusive-use hardware chip for artificial intelligence (AI), or a conventional general purpose processor (e.g., a CPU or an application processor) or a graphics-only processor (e.g., a GPU) and may be mounted on the cleaning robot 100 as described above. Herein, the exclusive-use hardware chip for artificial intelligence is a dedicated processor for probability calculation, and it has higher parallel processing performance than existing general purpose processor, so it may quickly process computation tasks in artificial intelligence such as machine learning. When the learning unit 1110 and the recognition unit 1120 are implemented as a software module (or a program module including an instruction), the software module may be stored in a computer-readable non-transitory computer readable media. In this case, the software module may be provided by an operating system (OS) or by a predetermined application. Alternatively, some of the software modules may be provided by an O/S, and some of the software modules may be provided by a predetermined application.

In this case, the learning unit 1110 and the recognition unit 1120 may be mounted on one electronic device, or may be mounted on separate electronic devices, respectively. For example, one of the learning unit 1110 and the recognition unit 1120 may be implemented in the cleaning robot 100, and the other one may be implemented in an external server. In addition, the learning unit 1110 and the recognition unit 1120 may provide the model information constructed by the learning unit 1110 to the recognition unit 1120 via wired or wireless communication, and provide data which is input to the recognition unit 1120 to the learning unit 1110 as additional data.

FIG. 11B is a block diagram illustrating the learning unit 1110 and the recognition unit 1120 according to various embodiments.

Referring to FIG. 11B (a), the learning unit 1110 according to some embodiments may implement a learning data acquisition unit 1110-1 and a model learning unit 1110-4. The learning unit 1110 may further selectively implement at least one of a learning data preprocessor 1110-2, a learning data selection unit 1110-3, and a model evaluation unit 1110-5.

The learning data acquisition unit 1110-1 may obtain learning data necessary for the recognition model for inferring a recognition object. The learning data acquisition unit 1110-1 may obtain entire images including an object, an image corresponding to an object area and object information as learning data. The learning data may be data collected or tested by the learning unit 1110 or the manufacturer of the learning unit 1110.

The model learning unit 1110-4 may use the learning data so that the artificial intelligence model has a criterion for identifying a predetermined recognition object. For example, the model learning unit 1110-4 may learn an artificial intelligence model through supervised learning of at least a part of the learning data. Alternatively, the model learning unit 1110-4 may learn, for example, by itself using learning data without specific guidance to make the artificial intelligence model learn through unsupervised learning which detects a criterion for identifying a situation. Also, the model learning unit 1110-4 may train the recognition model through reinforcement learning using, for example, feedback on whether the result of identifying a situation according to learning is correct. The model learning unit 1110-4 may also make an artificial intelligence model learn using, for example, a learning algorithm including an error back-propagation method or a gradient descent.

In addition, the model learning unit 1110-4 may learn a selection criterion about which learning data should be used for estimating a recognition object using input data.

The model learning unit 1110-4 may determine a recognition intelligence model having a great relevance between the input learning data and the basic learning data as a recognition model to be learned when there are a plurality of recognition models previously constructed. In this case, the basic learning data may be pre-classified according to the type of data, and the recognition model may be pre-constructed for each type of data. For example, basic learning data may be pre-classified based on various criteria such as a region in which learning data is generated, time when learning data is generated, size of learning data, a genre of learning data, a generator of learning data, a type of an object in learning data, or the like.

When the recognition model is learned, the model learning unit 1110-4 may store the learned recognition model. In this case, the model learning unit 1110-4 may store the learned recognition model in the memory 130 of the cleaning robot 100. Alternatively, the model learning unit 1110-4 may store the learned recognition model in a memory of a server connected to the cleaning robot 100 via a wired or wireless network.

The learning unit 1110 may further implement a learning data preprocessor 1110-2 and a learning data selection unit 1110-3 to improve the analysis result of the recognition model or to save resources or time required for generation of the recognition model.

The learning data preprocessor 1110-2 may preprocess acquired data so that the data obtained in the learning for identifying a situation may be used. That is, the learning data preprocessor 1110-2 may process the acquired data into a predetermined format so that the model learning unit 1110-4 may use the acquired data for learning to identify a situation.

The learning data selection unit 1110-3 may select data required for learning from the data acquired by the learning data acquisition unit 1110-1 or the data preprocessed by the learning data preprocessor 1110-2. The selected learning data may be provided to the model learning unit 1110-4. The learning data selection unit 1110-3 may select learning data necessary for learning from the acquired or preprocessed data in accordance with a predetermined selection criterion. The learning data selection unit 1110-3 may also select learning data according to a predetermined selection criterion by learning by the model learning unit 1110-4.

The learning unit 1110 may further implement the model evaluation unit 1110-5 to improve an analysis result of the recognition model.

The model evaluation unit 1110-5 may input evaluation data to the recognition model, and if the analysis result which is output from the evaluation result does not satisfy a predetermined criterion, the model evaluation unit 1110-5 may make the model learning unit 1110-4 learn again. In this case, the evaluation data may be predefined data to evaluate the recognition model.

For example, when the number or ratio of evaluation data for which analysis result is not correct exceeds a preset threshold, among the analysis results of the recognition model trained for the evaluation data, the model evaluation unit 1110-5 may evaluate that the data does not satisfy a predetermined criterion.

When there are a plurality of learned recognition models, the model evaluation unit 1110-5 may evaluate whether each learned recognition model satisfies a predetermined criterion, and determine the model which satisfies a predetermined criterion as a final recognition model. When there are a plurality of models that satisfy a predetermined criterion, the model evaluation unit 1110-5 may determine one or a predetermined number of models which are set in an order of higher evaluation score as a final recognition model.

Referring to FIG. 11B(b), the recognition unit 1120 according to some embodiments may implement a recognition data acquisition unit 1120-1 and a recognition result provision unit 1120-4.

In addition, the recognition unit 1120 may further implement at least one of a recognition data preprocessor 1120-2, a recognition data selection unit 1120-3, and a model update unit 1120-5 in a selective manner.

The recognition data acquisition unit 1120-1 may obtain data necessary for identifying a situation. The recognition result provision unit 1120-4 may apply the acquired data obtained from the recognition data acquisition unit 1120-1 to the learned recognition model as an input value to identify a situation. The recognition result provision unit 1120-4 applies the data selected by the recognition data preprocessor 1120-2 or the recognition data selection unit 1120-3 to be described later to the recognition model to obtain the analysis result. The analysis result may be determined by the recognition model.

In an embodiment, the recognition result provision unit 1120-4 may obtain (or estimate) object information corresponding to an object region by applying an object region including the obtained object to the learned recognition model.

In another embodiment, the recognition result provision unit 1120-4 may obtain (or estimate) a search category to provide a search result by applying at least one of an object region, object information, and context information obtained by the recognition data acquisition unit 1120-1 to a learned recognition model.

The recognition unit 1120 may further implement the recognition data preprocessor 1120-2 and the recognition data selection unit 1120-3 in order to improve a recognition result of the recognition model or save resources or time to provide the recognition result.

The recognition data preprocessor 1120-2 may preprocess the acquired data so that the acquired data may be used to identify a situation. That is, the recognition data preprocessor 1120-2 may process the obtained data into the predefined format by the recognition result provision unit 1120-4.

The recognition data selection unit 1120-3 may select data required for identifying a situation from the data acquired by the recognition data acquisition unit 1120-1 or the data preprocessed by the recognition data preprocessor 1120-2. The selected data may be provided to the recognition result provision unit 1120-4. The recognition data selection unit 1120-3 may select some or all of the obtained or preprocessed data according to a predetermined selection criterion for identifying a situation. The recognition data selection unit 1120-3 may also select data according to a predetermined selection criterion by learning by the model learning unit 1110-4.

The model update unit 1120-5 may control the updating of the recognition model based on the evaluation of the recognition result provided by the recognition result provision unit 1120-4. For example, the model update unit 1120-5 may provide the analysis result provided by the recognition result provision unit 1120-4 to the model learning unit 1110-4 so that the model learning unit 1110-4 may ask for further learning or updating the recognition model.

Figure 12:
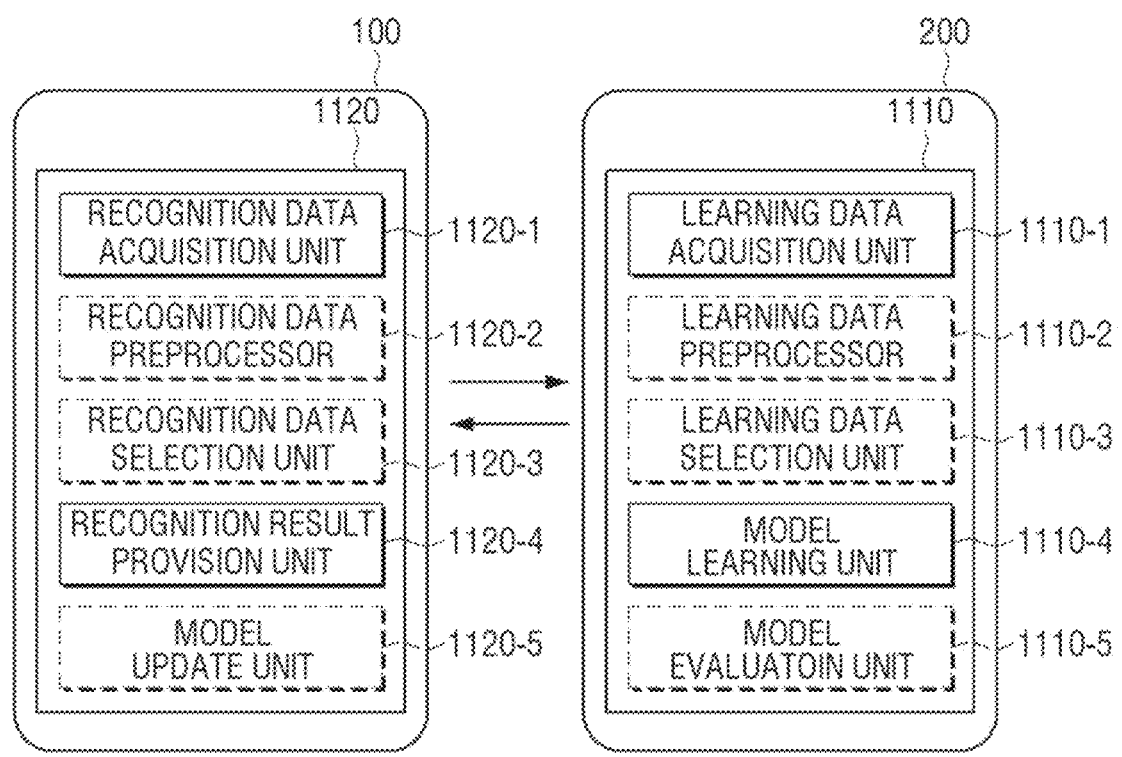
FIG. 12 is a diagram illustrating an example of learning and recognizing data through a cleaning robot and a server in association with each other according to an embodiment.

FIG. 12 is a view illustrating an example of learning and recognizing data by interlocking the cleaning robot 100 and the server 200 according to an embodiment.

Referring to FIG. 12, the server 200 may learn a criterion for identifying a situation, and the cleaning robot 100 may identify a situation based on the learning result by the server 200.

The model learning unit 1110-4 of the server 200 may perform the function of the learning unit 1110 shown in FIG. 11B. That is, the model learning unit 1110-4 of the server 200 may learn criteria regarding which object image, object information, context information should be used to identify a situation and how to identify a situation using the aforementioned data.

The recognition result provision unit 1120-4 of the cleaning robot 100 applies the data selected by the recognition data selection unit 1120-3 to the recognition model generated by the server 200 to obtain object information or a search category. Alternatively, the recognition result provision unit 1120-4 of the cleaning robot 100 may receive the recognition model generated by the server 200 from the server 200, and identify a situation using the received recognition model. The recognition result provision unit 1120-4 of the cleaning robot 100 may apply the object image selected by the recognition data selection unit 1120-3 to the recognition model received from the server 200 to identify object information corresponding to the object image. The recognition result provision unit 1120-4 may identify context information and a search category to obtain a search result using at least one of context information.

Figure 13:
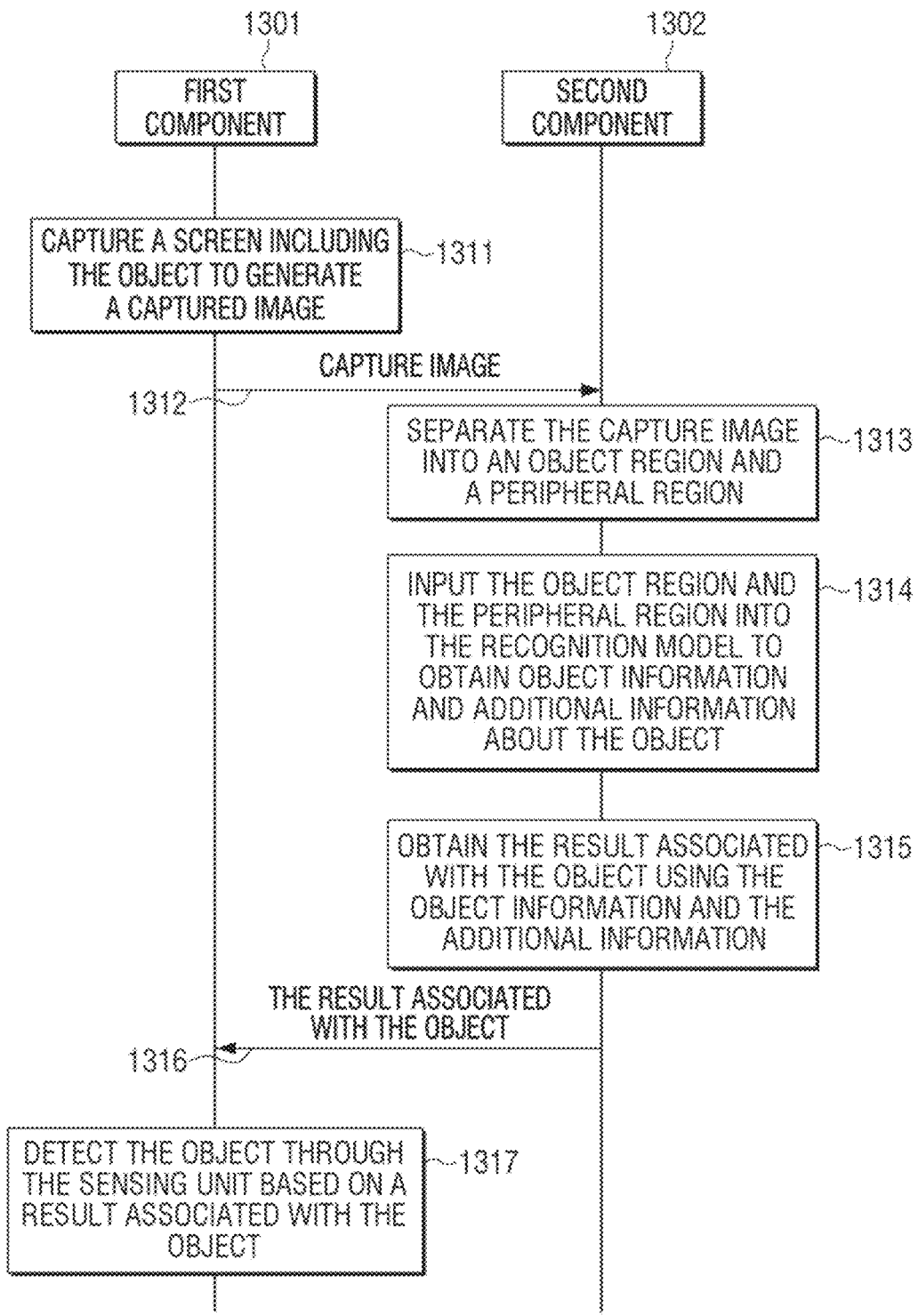
FIG. 13 is a flowchart of a network system using a recognition model according to an embodiment.

FIG. 13 is a flowchart of a network system using a recognition model according to an embodiment.

A first component 1301 may be the cleaning robot 100, and a second component 1302 may be the server 200 in which the recognition model is stored. The first component 1301 may be a general purpose processor, and the second component 1302 may be an AI-dedicated processor. Alternatively, the first component 1301 may be at least one application, and the second component 1302 may be an operating system (OS). The second component 1302 may be a component that is more integrated and dedicated, and has less delay, better performance, or larger resources than the first component 1301 and may be a component that may rapidly and effectively process many calculations required for generating, updating, or applying the data recognition model than the first component 1301.

Referring to FIG. 13, the first component 1301 may capture a surrounding environment including the object (e.g., an object disposed at a task area) to generate a captured image (1311). The first component 1301 may transmit the capture image to the second component 1302 (1312). The first component 1301 may transmit information about an object region corresponding to the object selected with the capture image.

The second component 1302 may separate the received capture image into an object region and a peripheral region (1313). The second component 1302 may separate the object region and the peripheral region based on information about the received object region.

The second component 1302 may input the separated object region and the peripheral region into the recognition model to obtain object information and additional information about the object (1314). The second component 1302 may obtain object information by inputting the object region to the object recognition model, and may input the peripheral region to the peripheral information recognition model to obtain additional information for the object. The second component 1302 may determine the search category and the priority of the search category based on the object information and additional information about the object.

The second component 1302 may obtain the result associated with the object using the obtained object information and the additional information (1315). The second component 1302 may obtain the result associated with the object by applying the object information and the additional information as input data to the recognition model. The second component 1302 may obtain the result by using the search category together. The second component 1302 may obtain the result by using additional data (e.g., the risk of obstacles, importance with respect to the user of obstacles) in addition to the object information and the additional information. The additional data may be transmitted from the first component 1301 or other elements or stored in the second component 1302.

When the second component 1302 transmits the result associated with the object to the first component 1301 (1316), the first component 1301 may detect the object through the sensing unit based on a result associated with the received object (1317).

Figure 14:
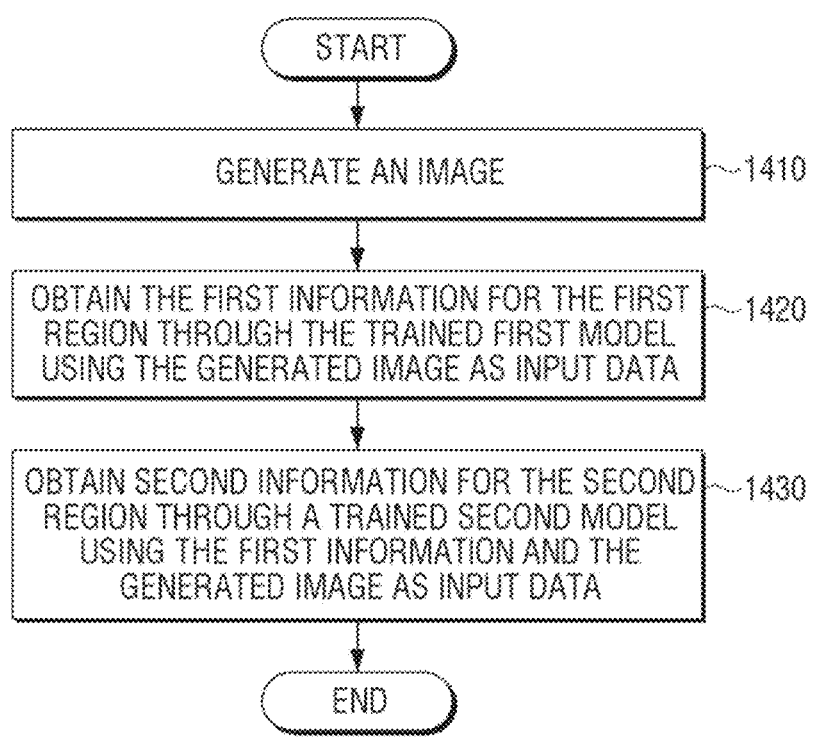
FIG. 14 is a flowchart illustrating an embodiment of providing a search result for a first area using a recognition model by the cleaning robot according to an embodiment.

FIG. 14 is a flowchart illustrating an embodiment of providing a search result for a first region using a recognition model by the cleaning robot according to an embodiment.

Referring to FIG. 14, the cleaning robot 100 may capture or photograph a surrounding environment and generate an image (1410). The cleaning robot 100 may obtain the first information for the first region through the trained first model using the generated image as input data (1420). The first model may be stored in the cleaning robot 100, but this is only one embodiment and may be stored in an external server.

The cleaning robot 100 may obtain second information for the second region through a trained second model using the first information and the generated image as input data (1430). The second model may be stored in the cleaning robot 100, but this is only one embodiment and may be stored in an external server.

When the first model and the second model are stored on the external server, the cleaning robot 100 may transmit the generated image to the external server, and receive the first information obtained by inputting the image from the external server into the first model and the second information obtained by inputting the first information to the second model.

As described above, information about the first region may be obtained more accurately by obtaining second information for the second region around the first region as well as the first information for the first region where the user input is detected.

Figure 15:
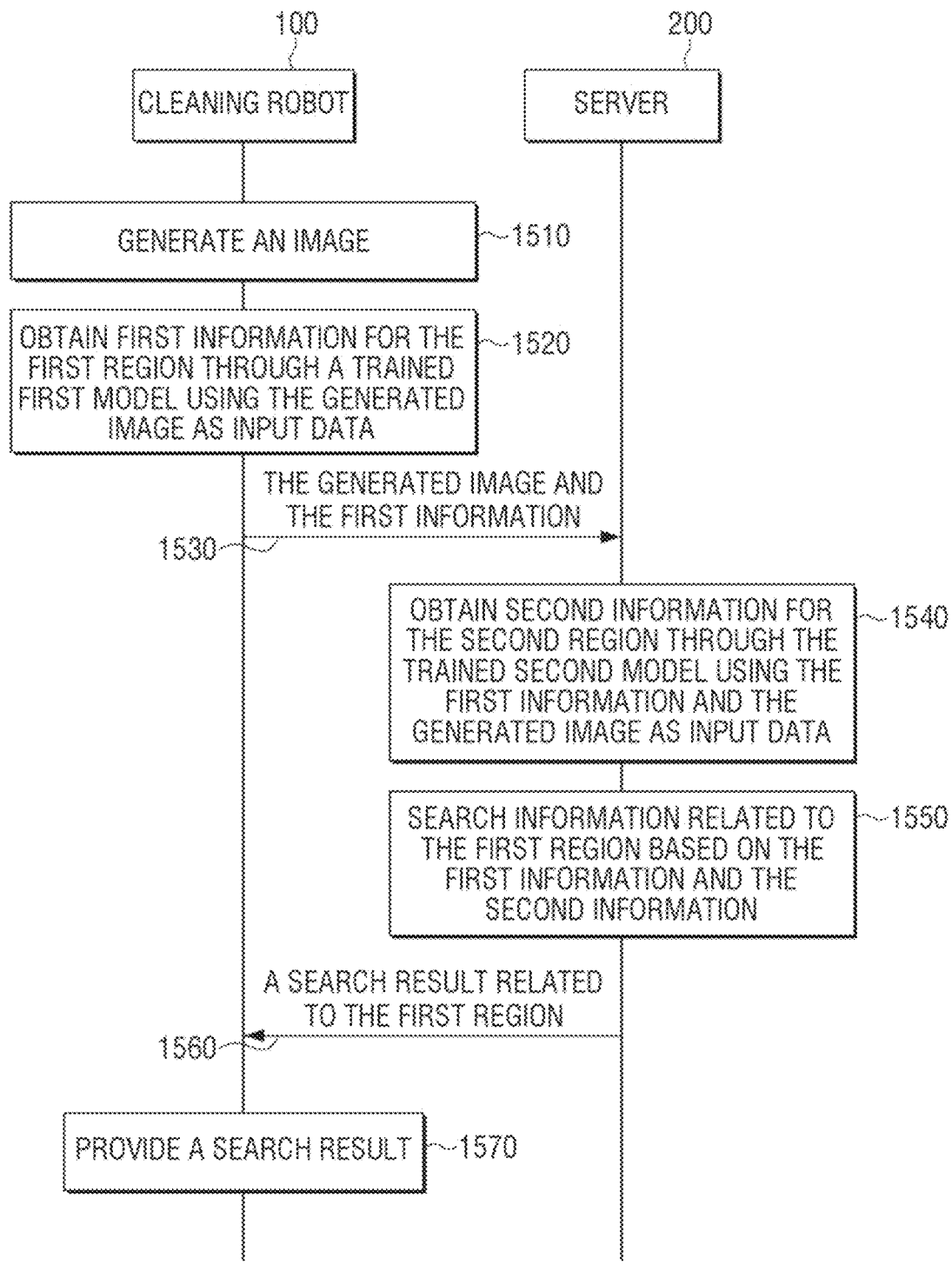
FIG. 15 is a flowchart of a system using a recognition model according to an embodiment.

FIG. 15 is a flowchart of a system using a recognition model according to an embodiment.

Referring to FIG. 15, the cleaning robot 100 may capture a peripheral environment to generate an image (1510). The cleaning robot 100 may obtain first information for the first region through a trained first model using the generated image as input data (1520).

The cleaning robot (100) may transmit the generated image and the first information to the server 200 (1530).

The server 200 may obtain second information for the second region through the trained second model using the first information and the generated image as input data (1540).

The server 200 may search information related to the first region based on the first information and the second information (1550).

The server 200 may transmit a search result related to the first region to the cleaning robot 100 (1560), and the cleaning robot 100 may provide a received search result (1570).

In the above embodiment, the operation of obtaining the first information through the first model for recognizing the object is performed by the cleaning robot 100, and the operation of obtaining the second information through the second model for estimating context information may be performed by the server 200. In other words, an object recognition operation capable of performing information with a small throughput may be performed by the cleaning robot 100, and a context estimation operation requiring a lot of throughput may be performed by the server 200.

In the embodiment of FIG. 15, one server 200 may obtain the first information or the second information through the learned model and search information related to the first region, but it is only one embodiment, and the plurality of servers may perform the above-described operations. The first server may obtain the first information and the second information through the learned model, and the second server may search information related to the first region based on the first information obtained from the first server and the second information. This is only one embodiment, and all procedures performed on the server 200 may be performed on the cleaning robot 100.

Figure 16:
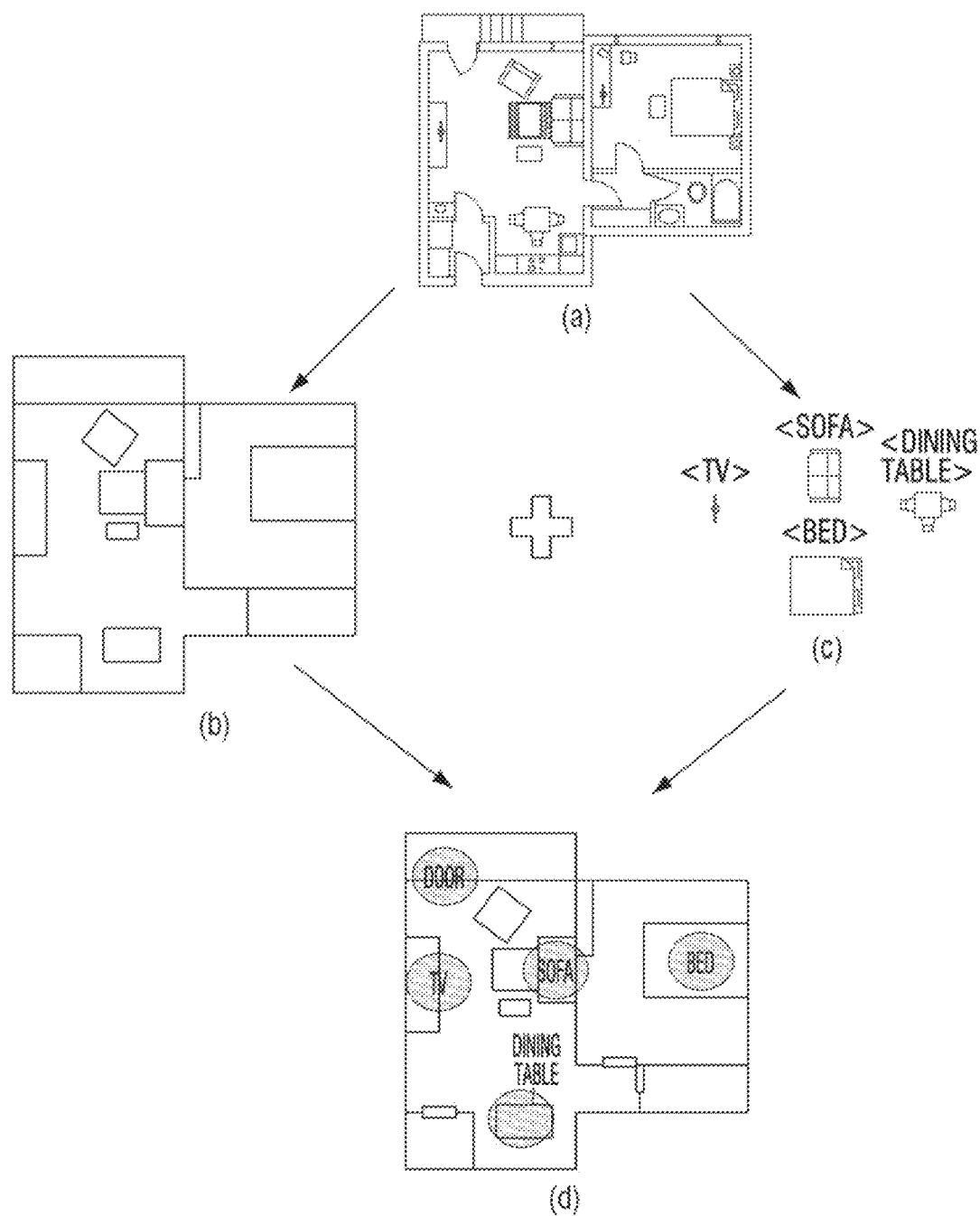
FIG. 16 is a diagram illustrating generating a semantic map according to an embodiment.

FIG. 16 is a diagram illustrating generating a semantic map according to an embodiment.

Referring to FIG. 16, the cleaning robot 100 may generate a navigation map as shown in FIG. 16B for a task area as shown in FIG. 16A. For example, the cleaning robot may detect a task area using at least one of the IR stereo sensor, an ultrasound sensor, the LiDAR sensor, a position sensitive detector (PSD) sensor, or an image sensor. The cleaning robot may generate a navigation map for traversing the cleaning robot by using the result of detecting the task area. Using the LiDAR sensor, preferentially, a navigation map in the form of a two-dimensional (2D) shape, such as in FIG. 16, may be generated using the LiDAR sensor. The navigation map may be displayed, for example, to be partitioned by one or more 2D lines.

The cleaning robot 100 may detect an object present in the task area using at least one of the camera 120, an object recognition sensor, the IR stereo sensor, an ultrasound sensor, the LiDAR sensor, or an image sensor for a task area as shown in FIG. 16A. The cleaning robot may apply the result of detecting the object to the learned artificial intelligence model to obtain the recognition information of the object. The result of detection of the object may include, for example, a photographing image of an object, a depth information of an object, medium information of an object, or a reflection coefficient of an object, but is not limited to the above example.

The cleaning robot 100 may obtain a name for each object, such as FIG. 16C as the recognition information of the object. The cleaning robot 100 may obtain at least one of the type of the object, the size of the object (e.g., the height of the object, the width of the object, or the depth of the object, etc.) or the feature of the object (e.g., the color of the object, a material of the object, etc.).

The cleaning robot 100 may map an area of an object included in the navigation map to the recognition information of the object, and may generate a semantic map indicating the environment of the task area where the cleaning robot 100 performs the operation. The cleaning robot 100 may identify a boundary of the object corresponding to the object in the navigation map. When the boundary of the object is identified, the cleaning robot 100 may determine the area of the object by the boundary of the object.

When the area of the object is determined, the cleaning robot 100 may map the recognition information of the object and the object area.

According to one example, the cleaning robot 100 may map recognition information of an object and an object area included in a navigation map based on a location of the object according to a detection result of the object. If a location of the object in a situation where an object is detected to generate the navigation map (e.g., an object detection result is obtained) and a location of the object in a situation where an object is detected to obtain recognition information of an object (e.g., a detection result of an object is obtained or an image of an object is stored) are identical or similar in a threshold range, the object area included in the navigation map and the object recognition may be mapped with each other.

According to another example, the cleaning robot 100 may map recognition information of an object and the object area included in the navigation map based on the shape of the object according to a detection result of the object. Specifically, the cleaning robot 100 may compare the shape of the object according to the result of detecting the object to generate the navigation map and the shape of the object included in the recognition information of the object, and if the shapes are identical or similar, the cleaning robot may map the recognition information of the object and the object area included in the navigation map with each other.

As a result of mapping the object area and the recognition information of the object, the cleaning robot 100 may generate a semantic map representing the environment of the task area, as shown in FIG. 16D. The cleaning robot 100 may display the generated semantic map through a display. When the cleaning robot 100 transmits the generated semantic map to an external user terminal device, the user terminal device may display the semantic map through the display.

Alternatively, the user terminal device or an external server may generate a semantic map. For example, when the cleaning robot 100 transmits the navigation map and the recognition information of the object to the user terminal device or the external server, the user terminal device or the external server may generate the semantic map. In another example, when the cleaning robot 100 transmits the result of detecting the object and the navigation map to the user terminal device or the external server, the user terminal device or the external server may generate a semantic map.

In the object region of the semantic map, object recognition information may be displayed as a text (e.g., a name of an object) or an icon. Alternatively, the object area of the semantic map may be displayed in a reference form. The recognition information of the object may be displayed with respect to an indicator line indicating the object area, or the object area may be classified by colors and recognition information of the object may be displayed based on the classified colors.

Figure 17:
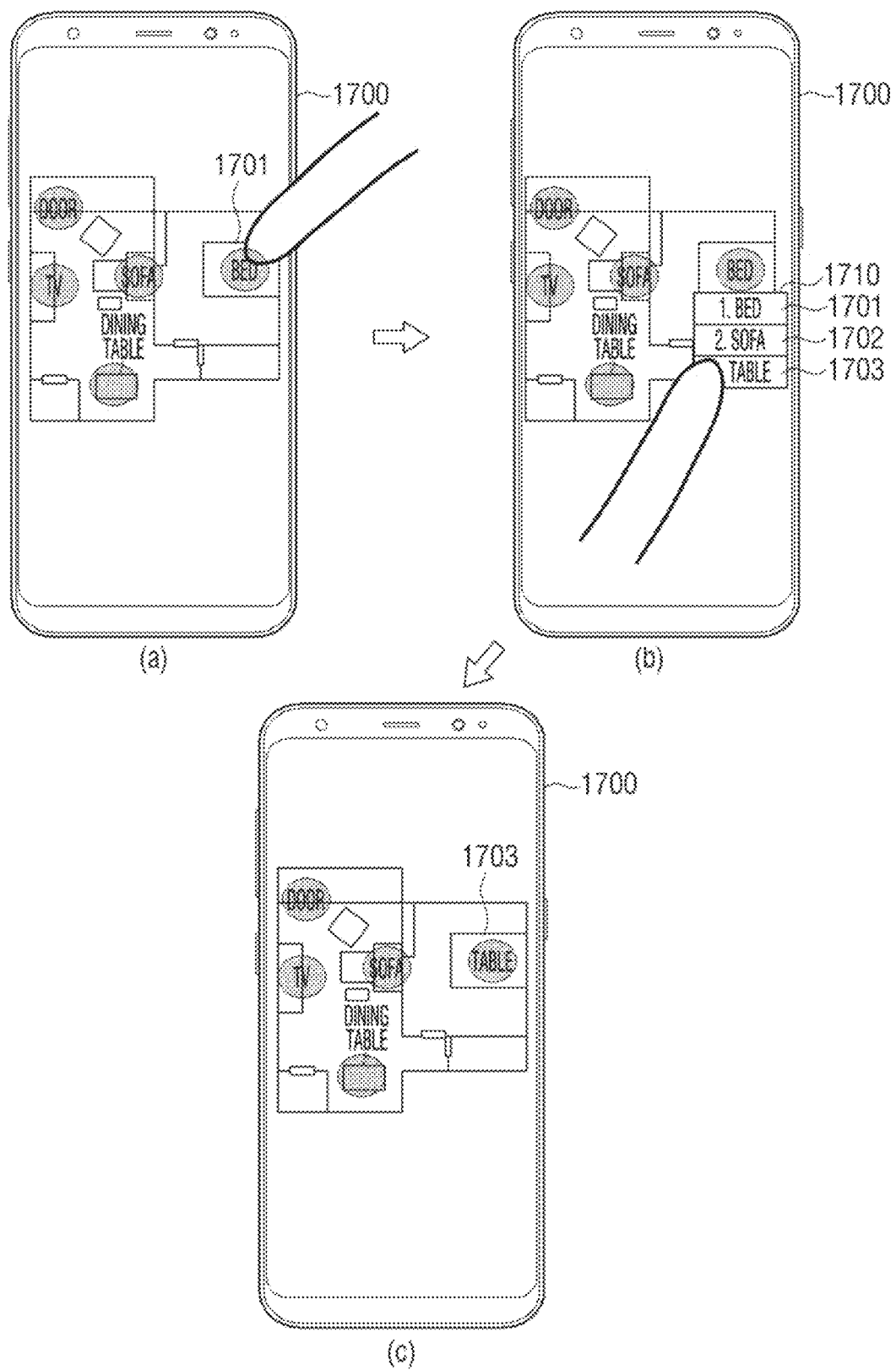
FIG. 17 is a diagram illustrating a user interface for using a semantic map according to an embodiment.

FIG. 17 is a diagram illustrating a user interface for using a semantic map according to an embodiment.

Referring to FIG. 17A, a user terminal device 1700 may display a semantic map. The semantic map may be generated through the process of FIG. 16, for example. For example, in the semantic map, at least one of a three-dimensional (3D) map or a navigation map (e.g., LiDAR map) in which the structure of the task area is reflected may be displayed as a background.

For example, a bed 1701 may be displayed on at least a part of an object region of the semantic map as the object recognition information. The user may select the bed 1701 which is the recognition information.

In response to the user's selection, the user terminal device 1700 may display a drop down box 1710 associated with the selected recognition information 1701, as shown in FIG. 17. The drop down box 1710 may display names of objects which may replace the selected recognition information. For example, as a result of applying the result of detecting an object to a trained artificial intelligence model, the recognition result of the object may be recognized as a bed 50%, a sofa 30%, a table 20% or the like. The names applicable to the object may be sequentially displayed on the drop down box 1710 according to an order in which the recognition result value is high. For example, in the list of the drop down box 1710, the bed 1701 may be displayed in a first filed, a sofa 1702 in a second field, and a table 1703 in a third field, respectively.

When a user selects a name (e.g., the table 1703), as illustrated in FIG. 17C, the user terminal device 1700 may display the changed recognition information 1703 of the object on a navigation map.

Figure 18:
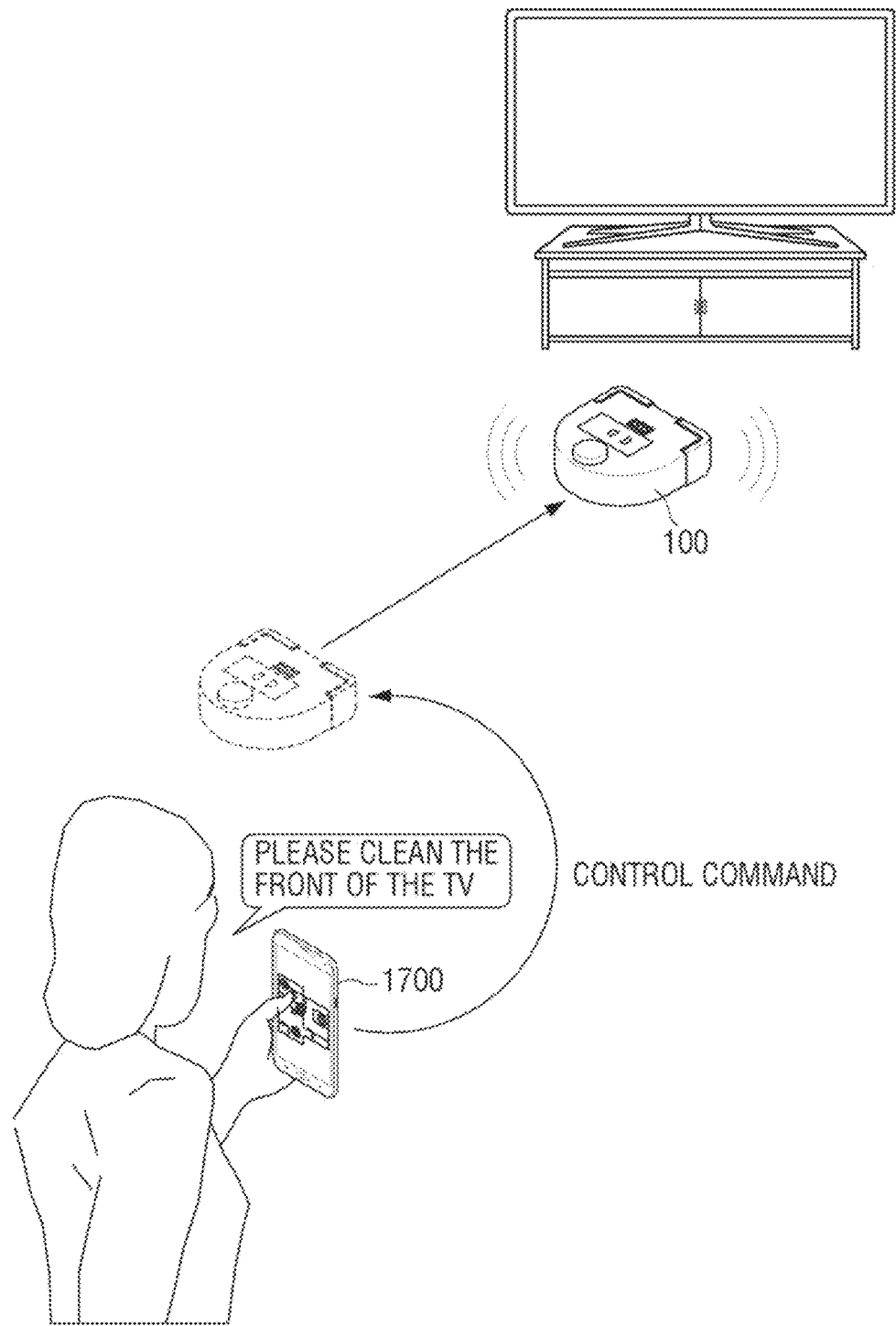
FIG. 18 is a diagram illustrating a situation of controlling a cleaning robot using a semantic map according to an embodiment.

FIG. 18 is a diagram illustrating a situation of controlling a cleaning robot using a semantic map according to an embodiment.

Referring to FIG. 18, the user may perform a control command using the recognition information of the object displayed on the semantic map provided by the user terminal device 1700. According to an example, the recognition information of at least one object displayed in the semantic map of FIGS. 16 and 17 may be displayed on the display of the user terminal device 1700. The user may utter "please clean the front of the TV" to designate a cleaning zone.

According to the user's utterance command, the user terminal device 1700 may recognize the user's utterance command and may transmit the user's control command corresponding to the recognized utterance command to the cleaning robot 100. The control command may be a command requesting the execution of a task with respect to a region related to a specific object. The cleaning robot 100 may perform a task based on a user's control command. According to an example, the cleaning robot 100 may move to the front of a TV and clean the front of the TV.

Figure 19:
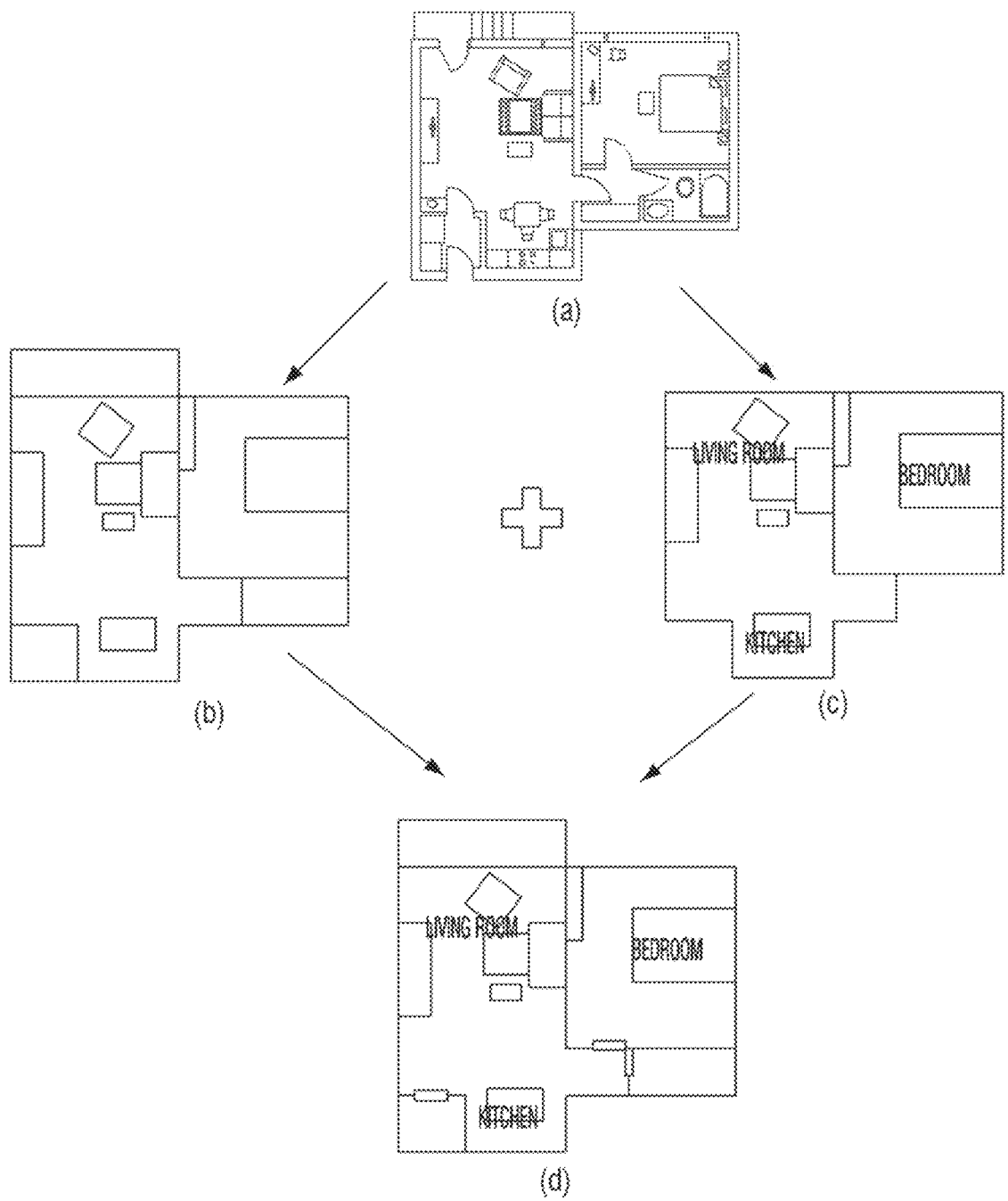
FIG. 19 is a diagram illustrating generating a semantic map according to an embodiment.

FIG. 19 is a diagram illustrating generating a semantic map according to an embodiment.

Referring to FIG. 19, the cleaning robot 100 may generate a navigation map as FIG. 19B based on a task area as illustrated in FIG. 19A. A specific description of generating the navigation map corresponds to FIGS. 16A and B and will not be described redundantly.

The cleaning robot 100 may obtain recognition information of each place of the task area using a result of detecting the task area as FIG. 19A. For example, the cleaning robot 100 may obtain a name of each space as illustrated in FIG. 19C as recognition information.

According to various embodiments, the cleaning robot 100 may obtain recognition information of each space in the task area by applying a plurality of images capturing each space of the task area to the trained artificial intelligence model.

According to various embodiments, the cleaning robot 100 may recognize the door 700, 710 by detecting the object as illustrated in FIGS. 7A and 7B and determine the structure of the task area using the recognized doors 700 and 710. The cleaning robot 100 may obtain the recognition information of each location which is classified by a structure of the task area. For example, the cleaning robot 100 may recognize a region having the widest structure and largest doors as a living room and may recognize a second widest area as a bedroom.

According to various embodiments, the cleaning robot 100 may obtain recognition information of each space of the task area using recognition information of an object located in each space of the task area. For example, the cleaning robot 100 may determine an area where a dining table is recognized as a kitchen, recognize an area where a bed is recognized as a bedroom, and an area where a TV or a sofa is recognized as a living room.

When recognition information of each space if obtained, the cleaning robot 100 may generate the semantic map representing the environment of the task area as FIG. 19D, by using obtained recognition information of each space and the navigation map. The cleaning robot 100 may display the generated semantic map through a display. Alternatively, when the cleaning robot 100 transmits the generated semantic map to an external user terminal device, the user terminal device may display the semantic map through the display.

Alternatively, the user terminal device or the external server may generate the semantic map. For example, when the cleaning robot 100 transmits the navigation map and the recognition information of each location to a user terminal device or an external server, the user terminal device or the external server may generate the semantic map. According to another example, when the cleaning robot 100 transmits the result of detecting an object included in each location of the navigation map and the task area to the user terminal device or an external server, the user terminal device or the external server may generate the semantic map.

Figure 20:
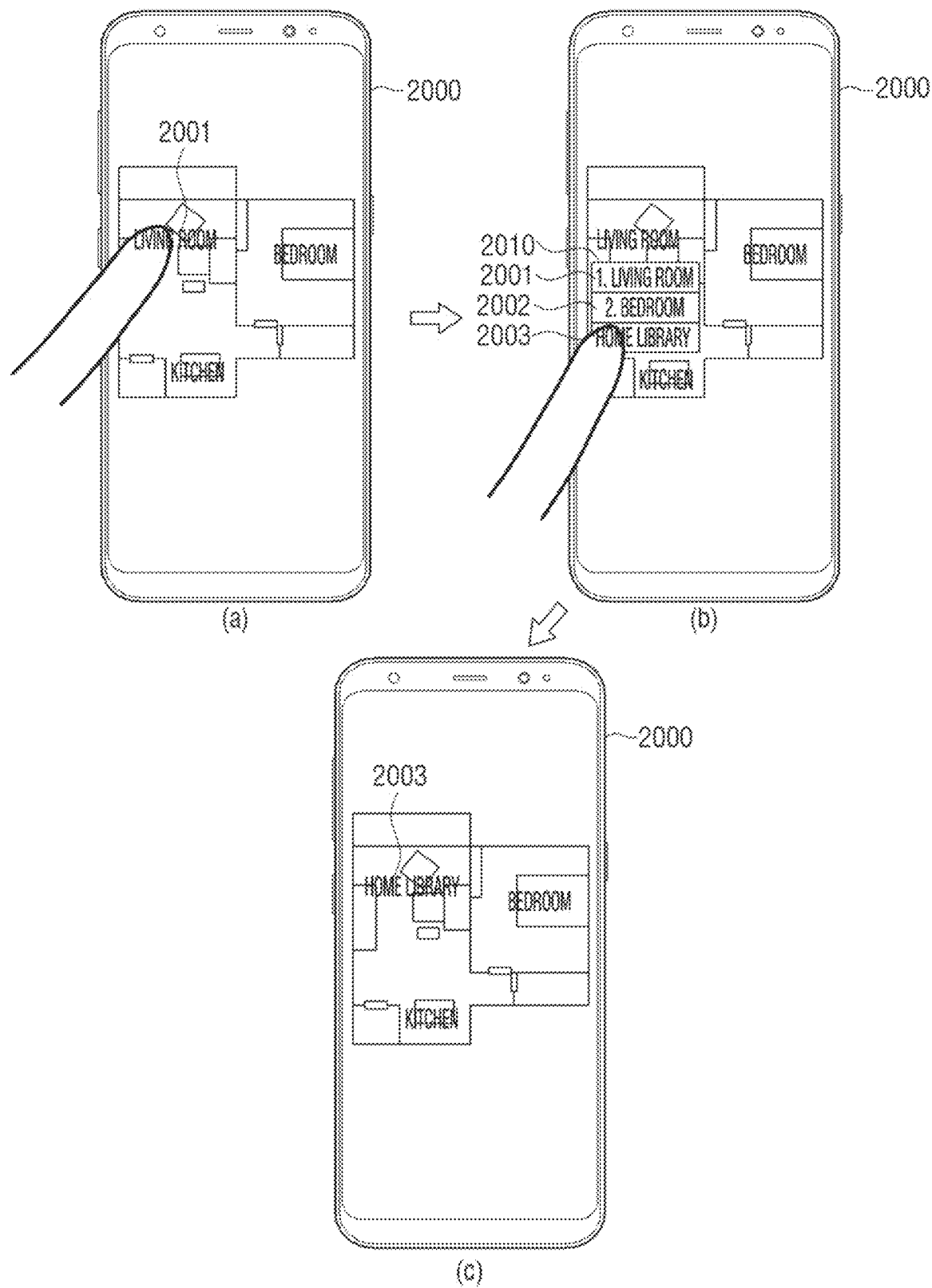
FIG. 20 is a diagram illustrating a user interface for using a semantic map according to an embodiment.

FIG. 20 is a diagram illustrating a user interface for using a semantic map according to an embodiment.

Referring to FIG. 20A, a user terminal device 2000 may display a semantic map. The semantic map may be generated through a process of FIG. 18. For example, the semantic map may display the recognition information of the object with at least one of the 3D map or navigation map in which the structure of the task area is reflected, as a background.

In at least a portion of the object area of the semantic map, a living room 2001 may be displayed as the recognition information of a space. The user may select the living room 2001 which is the recognition information.

In response to the user's selection, the user terminal device 2000 may display a drop down box 2010 associated with the selected recognition information 2001, as shown in FIG. 20. In the drop down box 2010, names of places which may replace the selected recognition information may be displayed. For example, as a result of applying an image photographed in one place to a trained artificial intelligence model, the recognition result of one place may be recognized as 50% for a living room, 40% for a bedroom, and 20% for a home library. According to a descending order of a recognition result value, the names applicable to one space may be sequentially displayed on the drop down box 2010. For example, in the list of the drop down box 2010, a living room 2001 may be displayed in the first field, a bedroom 2002 in the second field, and a home library 2003 in the third field, respectively.

When the user selects a name (e.g., home office 2003), as illustrated in FIG. 20C, the user terminal device 2000 may display the recognition information 2003 of the changed location on the navigation map.

Figure 21:
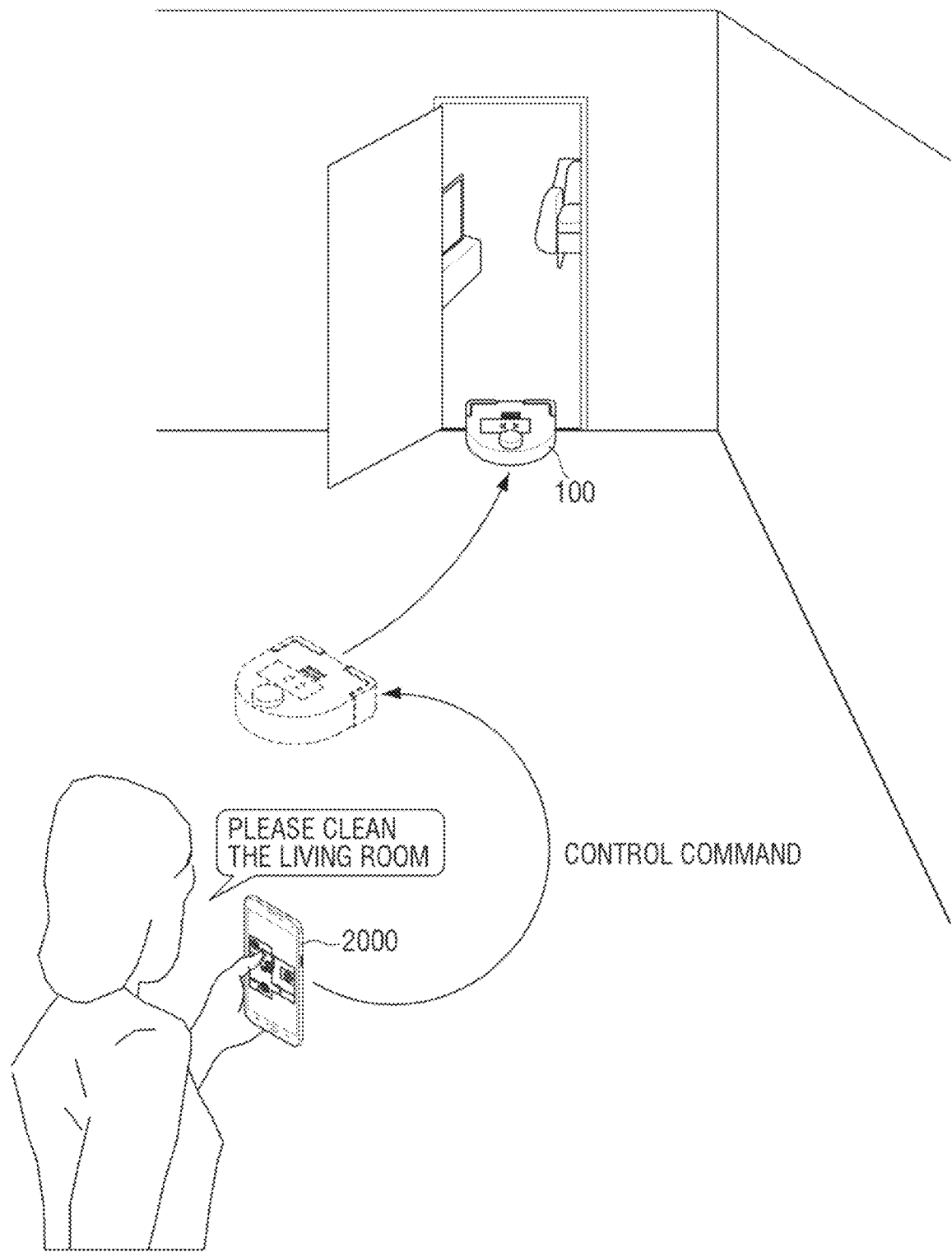
FIG. 21 is a diagram illustrating a situation of controlling a cleaning robot using a semantic map according to an embodiment.

FIG. 21 is a diagram illustrating a situation of controlling a cleaning robot using a semantic map according to an embodiment.

Referring to FIG. 21, the user may perform a control command using recognition information of each location displayed on the semantic map provided by the user terminal device 2000. For example, in the display of the user terminal device 2000, recognition information of each location displayed on the semantic map of FIGS. 19 and 20 may be displayed. The user may utter "please clean a living room" to designate a cleaning zone.

According to the user's utterance command, the user terminal device 2000 may recognize the user's utterance command and may transmit the user's control command corresponding to the recognized user's utterance command to the cleaning robot 100. The control command of the user may be a command requesting the execution of a task for a particular location. The cleaning robot 100 may perform a task based on a user's control command. For example, the cleaning robot 100 may move to a living room to clean the living room.

According to various embodiments, the user terminal device may display a semantic map including the recognition information of the object of FIG. 17A and all the recognition information of each location of FIG. 20A. When one recognition information of the recognition information of the object and the recognition information of each space is selected, the user terminal device may provide a user interface for changing the selected recognition information.

According to an example, the user terminal device may provide a candidate list for changing selected recognition information. The candidate list may include changeable names, and the names may be arranged according to the descending order of high probability value in consideration of the recognition result of the artificial intelligence model. If the user input selecting one name is detected, the user terminal device may change the existing recognition information of the object with the selected name and display the same.

Figure 22:
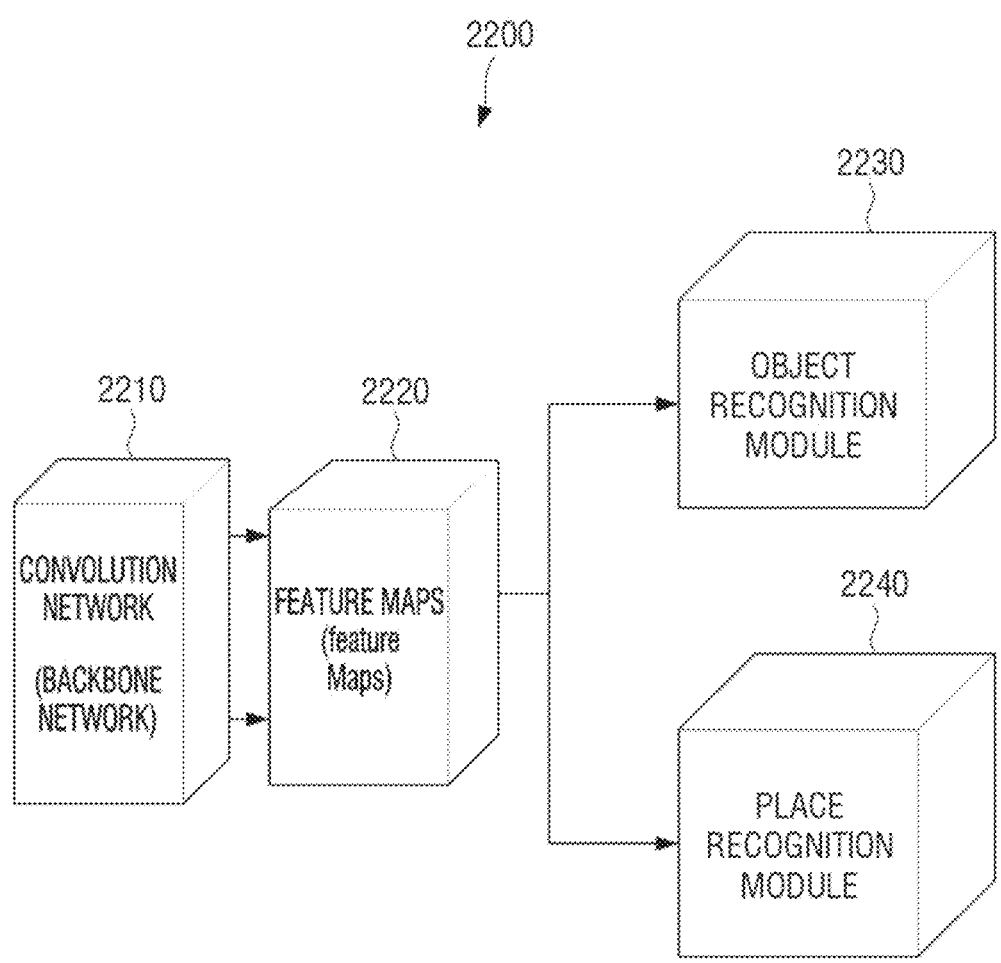
FIG. 22 is a diagram illustrating a process of recognizing an object according to an embodiment.

FIG. 22 is a diagram illustrating a process of recognizing an object according to an embodiment.

According to the embodiment above, the cleaning robot 100 may obtain recognition information of an object by applying the image which captures the object using the camera 120 to the trained artificial intelligence model. The cleaning robot 100 may obtain the recognition information of the location by applying the image which captures the location of the task region to the trained artificial intelligence model.

According to another example, when the cleaning robot 100 captures an object at a particular location, the cleaning robot 100 may apply the captured image to the trained artificial intelligence model to obtain the recognition information of the object and the location of the location together. An electronic device (e.g., external server) 2200 equipped with the artificial intelligence model may apply the end-to-end feature map 2220 generated through an object recognition network (e.g., convolution network model) 2210 to a classifier and may perform a function of an object recognition module 2230 for recognizing an object and a place recognition module 2240 for recognizing a space of an object. A learning step may be simplified as a loss for the recognition of the object and a loss for the recognition of a place are simultaneously trained.

For the photographed image, if the recognition of the object and recognition of the location are performed together, more accurate recognition of the object may be possible. For example, the recognition result of the object included in the photographed image may be recognized as 50% for a table, 30% for a dining table, and 20% for a desk. When the location where the object is placed is recognized as a kitchen, the electronic device 2300 may finally recognize the object as a dining table rather than a table. According to another example, if the recognition result of the object and the place where the object is positioned are a study room and a table, respectively, the object may be finally recognized as a desk. According to another example, if the recognition result of the object and the place where the object is disposed are an entrance and a door, respectively, the object may be finally recognized as an entrance door. According to another example, if the recognition result of the object and the place where the object is disposed are a room and a door, respectively, the object may be finally recognized as a room door. According to another example, when the recognition result of the object and the place where the object is disposed are a threshold and a room, respectively, the object may be finally recognized as a threshold of a room door. According to another example, if the recognition result of the object and the place where the object is disposed are a threshold and a veranda, respectively, the object may be finally recognized as a veranda threshold.

As described above, for the photographed image, when the object and the place including the object are recognized together through one network, the electronic device 200 or the cleaning robot 100 may more efficiently generate a semantic map representing the environment of the task area. For example, the location information of the object is displayed together as well as the recognition information of the object in the semantic map.

Figure 23:
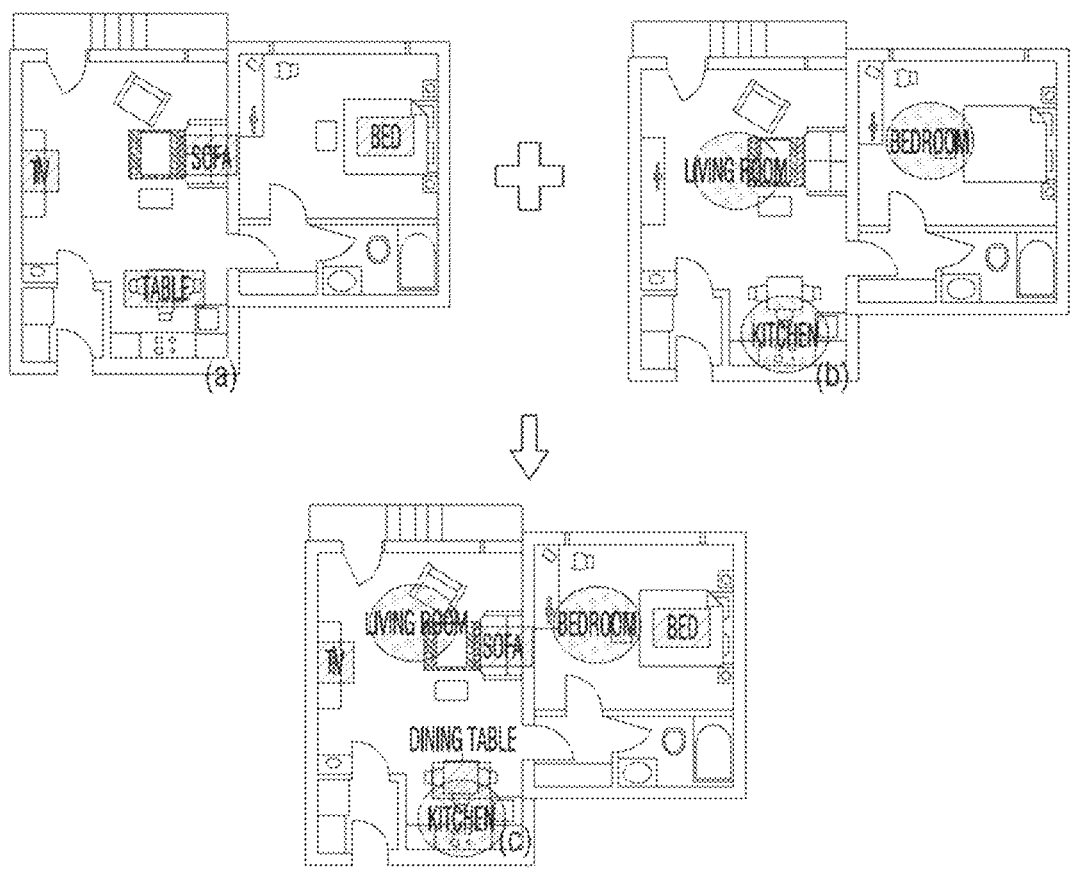
FIG. 23 is a diagram illustrating a process of generating a semantic map according to an embodiment.

FIG. 23 is a diagram illustrating a process of generating a semantic map according to an embodiment.

When the image photographed by the cleaning robot 100 using the camera 120 is applied to the network included in the electronic device 2200 described above, the semantic map may display at least one of the object recognition information and the place recognition information (or context of a place).

For example, the cleaning robot 100 may apply the photographed image to the object recognition module 2230 of FIG. 22 to generate a first semantic map as shown in FIG. 23A. In the first semantic map of FIG. 23A, the name of the object may be displayed in a location corresponding to the object as the identification information of the object. The cleaning robot 100 may apply the photographed image to the place recognition module 2240 of FIG. 22 to generate a second semantic map as shown in FIG. 23B. In the semantic map of FIG. 23B, a name of a place as recognition information of a place may be displayed in a region corresponding to the location among the segmented areas of the task.

The cleaning robot 100 may combine the first semantic map of FIG. 23A and the second semantic map of FIG. 23B to generate a final semantic map as shown in FIG. 23C. The final semantic map of FIG. 23C may display the name of the object present in the task area and the name of a place, as the environment information of the task area.

Figure 24:
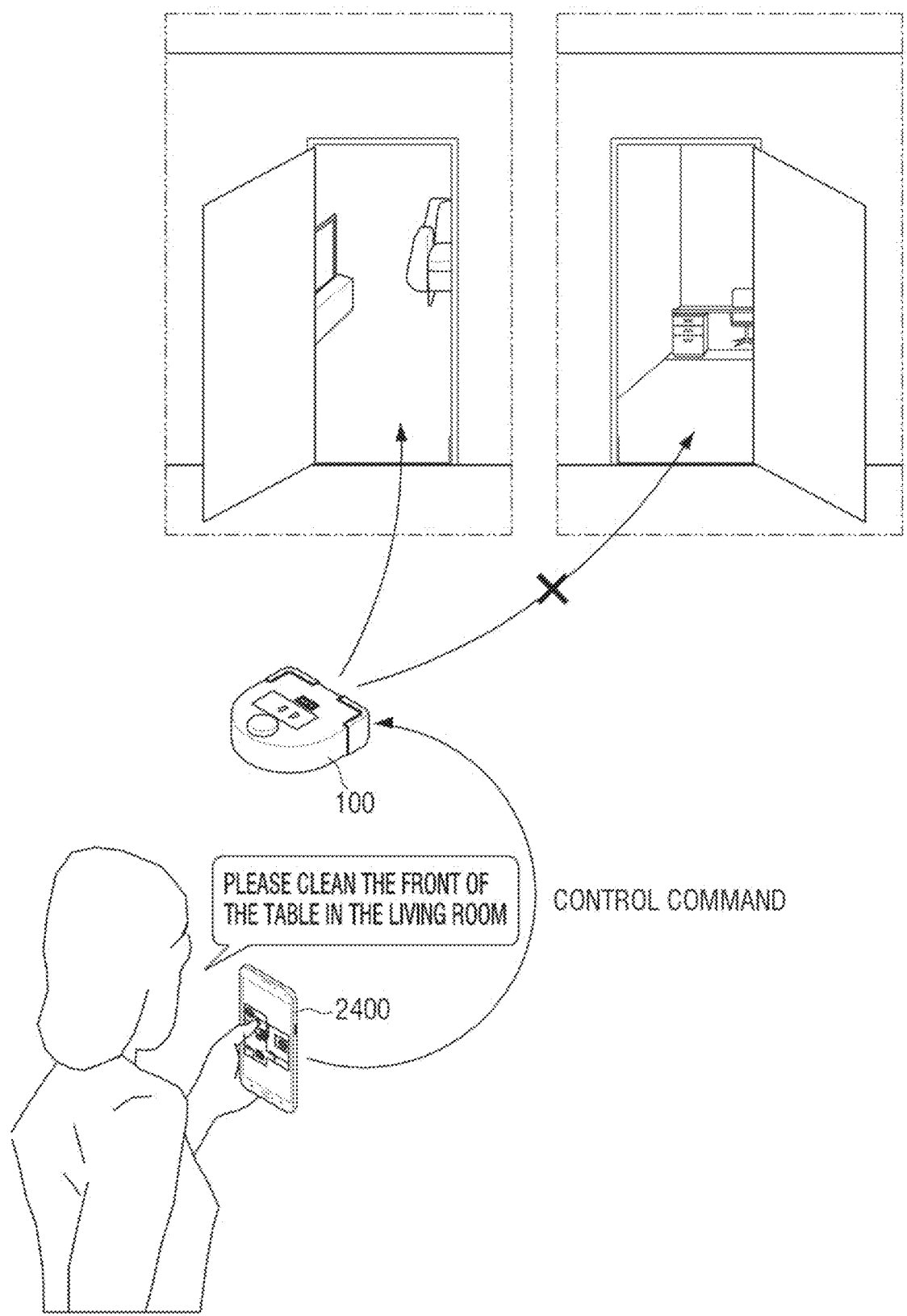
FIG. 24 is a diagram illustrating a situation of controlling a cleaning robot using a semantic map according to an embodiment.

FIG. 24 is a diagram illustrating a situation of controlling a cleaning robot using a semantic map according to an embodiment.

Referring to FIG. 24, the user may perform a control command using the object displayed in the semantic map provided by the user terminal device 2400 and the recognition information of each location. For example, the display of the user terminal device 2400 may be displayed with the object displayed in the semantic map of FIG. 23 and the recognition information of each location as described above. The user may utter "please clean the front of the table at a living room" to designate the cleaning zone.

According to the user's utterance command, the user terminal device 2400 may recognize the user's utterance command. The user terminal device 2400 may transmit a control command of the user corresponding to the recognized utterance command to the cleaning robot 100. The control command may be a command requesting the execution of a task for a region related to a specific object located in a specific place. The cleaning robot 100 may perform a task based on a user's control command. For example, the cleaning robot 100 may move to the front of the table located at the living room among the places (living room or home library) where a table is positioned, to clean the front of the table.

According to various embodiments, referring to FIGS. 18, 21, and 24, according to the user's utterance command, the cleaning robot 100 may directly recognize the user's utterance command. The cleaning robot 100 may include at least one of an automatic speech recognition (ASR) module, a natural language understanding (NLU) module, and a path planner module for recognizing a user's utterance command. As the user utters to designate the cleaning zone, the cleaning robot 100 may recognize the user's utterance command using at least one of the modules described above. The cleaning robot 100 may perform a task according to the recognized user's control command. For example, the cleaning robot 100 may perform tasks according to the user's control command based on the environment information included in the stored semantic map (e.g., the name of the object, the name of the place, etc.).

According to various embodiments, referring to FIGS. 18, 21, and 24, according to the user's utterance command, a third voice recognition device (e.g., a home voice recognition hub, an artificial intelligence speaker, etc.) may recognize the user's utterance command. The third voice recognition device may include at least one of an automatic voice recognition module, an automatic voice recognition module, a natural language understanding module, and a path planner module. The third voice recognition device may recognize the user's utterance command and transmit the user's control command corresponding to the recognized speech command to the cleaning robot 100. As the restriction of a place or a device is minimized, the cleaning robot 100 is able to perform a task according to a control command of the user.

Figure 25:
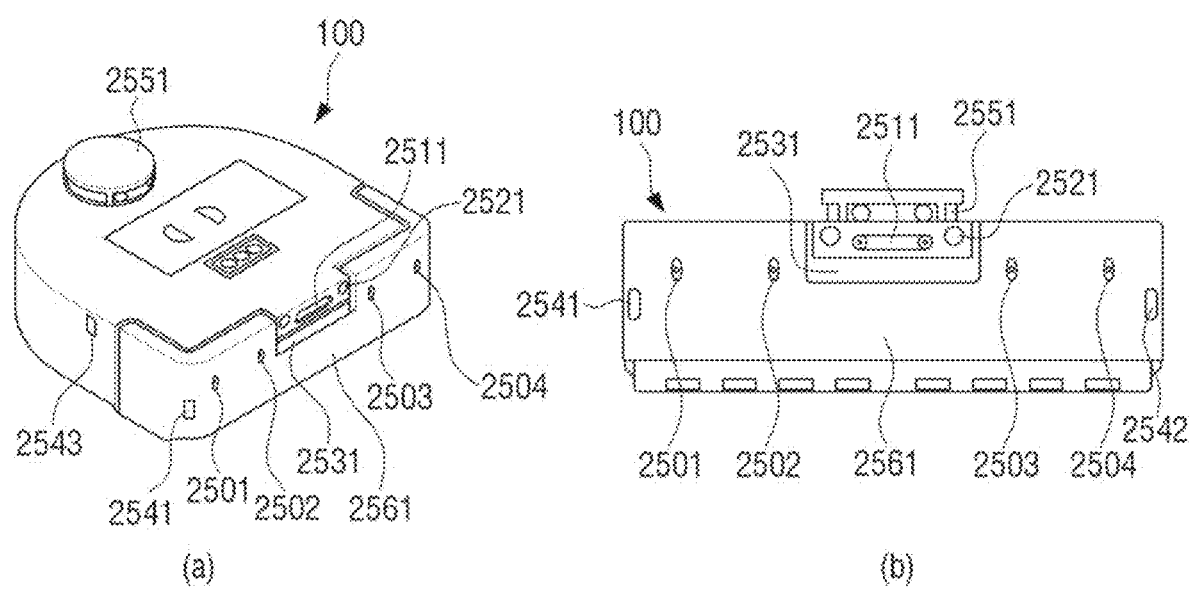
FIG. 25 is a diagram illustrating a configuration of a device of a cleaning robot according to an embodiment.

FIG. 25 is a diagram illustrating a configuration of a device of a cleaning robot according to an embodiment.

FIG. 25A is a perspective diagram of the cleaning robot 100 including a plurality of sensors, and FIG. 25B is a front view of the cleaning robot 100 including a plurality of sensors.

Referring to FIG. 25, the cleaning robot 100 may include at least one of the IR stereo sensor, LiDAR sensor, the ultrasonic sensor, a 3D sensor, an object recognition sensor, a fall detection sensor, or a PSD sensor, as a plurality of sensors.

The functions of the IR stereo sensor, the LiDAR sensor, and the ultrasonic sensor are described in detail in FIG. 2 and a detailed description will be omitted. The ultrasonic sensor may be composed of, for example, two light emitting sensor modules and two light receiving sensor modules. The cleaning robot 100 may detect an object of the front surface by using a 3D sensor to extract a 3D of the object. The cleaning robot 100 may obtain the size and distance information of the object. The cleaning robot 100 may detect an object of the front surface by using the object recognition sensor to obtain the type of the object. For example, the cleaning robot 100 may photograph an object using a camera included in the object recognition sensor, and apply the photographed image to the trained artificial intelligence model to obtain the type of the object as a result of the application. The cleaning robot 100 may recognize a stepped portion (e.g., a stepped portion between a living room floor and an entrance) of a floor when traversing forward and backward using the fall detection sensor. The fall detection sensor may be provided, for example, by two in the front and back, respectively. The cleaning robot 100 may detect the position of an object of a proximity distance (e.g., within 15 cm) using the PSD sensor. For example, the cleaning robot 100 may perform cleaning while detecting the object using the PSD sensor or traversing along the wall. The PSD sensor may be provided on the left and right sides of the front direction by 45 degrees outward direction, or may be provided on the right and left sides of the cleaning robot 100, respectively.

Referring to FIG. 25, the plurality of sensors may be provided at the front direction, rear direction, or side surface of the cleaning robot 100. For example, at the front of the cleaning robot 100, at least one of an ultrasonic sensor 2501 to 2504, at least one 3D sensor 2511, at least one camera (e.g., RGB camera) 2521, the IR stereo sensor (e.g., the IR stereo sensor for docking) 2531, the PSD sensor 2541, 2542, LiDAR sensor 2551, or a bumper sensor 2561. At the side surface of the cleaning robot 100, another PSD sensor (not illustrated) may be provided.

Figure 26A:
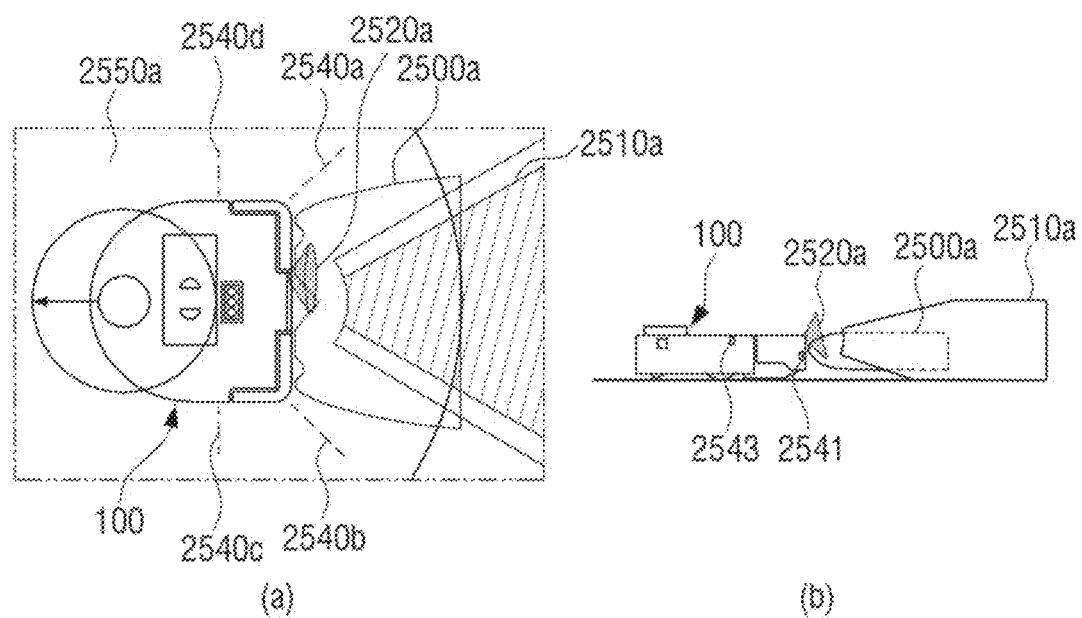

FIGS. 26A and 26B are diagrams illustrating a detection range of the cleaning robot according to an embodiment.

FIG. 26A(a) is a top view of the cleaning robot 100, FIG. 26A(b) is a side view of the cleaning robot 100, and FIG. 26B(c), (d) is a perspective view of the cleaning robot 100.

Referring to FIGS. 26A and 26B, the cleaning robot 100 may detect a structure in a house or the object during traversing using a plurality of sensors.

Referring to FIGS. 26A and 26B, the detection range of the 3D sensor 2511 is approximately a first range 2510a, the detection range of the ultrasonic sensors 2501 to 2504 may be a second range 2500a, the detection range of the front PSD sensor 2541, 2542 may be a third range 2540a, 2540b, the detection range of side PSD sensors 2543 (not shown) may be a fourth range 2540c, 2540d, the detection range of the LiDAR sensor 2551 may be a fifth range 2550a, and a photographing angle of a camera 2521 may be a sixth range 2520a, but the above example is merely an example, and the range of detection or photographing may be variously predicted based on the specification or mounting position of the plurality of sensors.

The cleaning robot 100 may select at least one sensor among the plurality of sensors described above based on recognition information of the object. The cleaning robot 100 may detect an object using at least one selected sensor and may obtain additional information for the object using the detection result. The cleaning robot 100 may determine a task to be performed by the cleaning robot 100 based on the additional information for the object.

Figure 27:
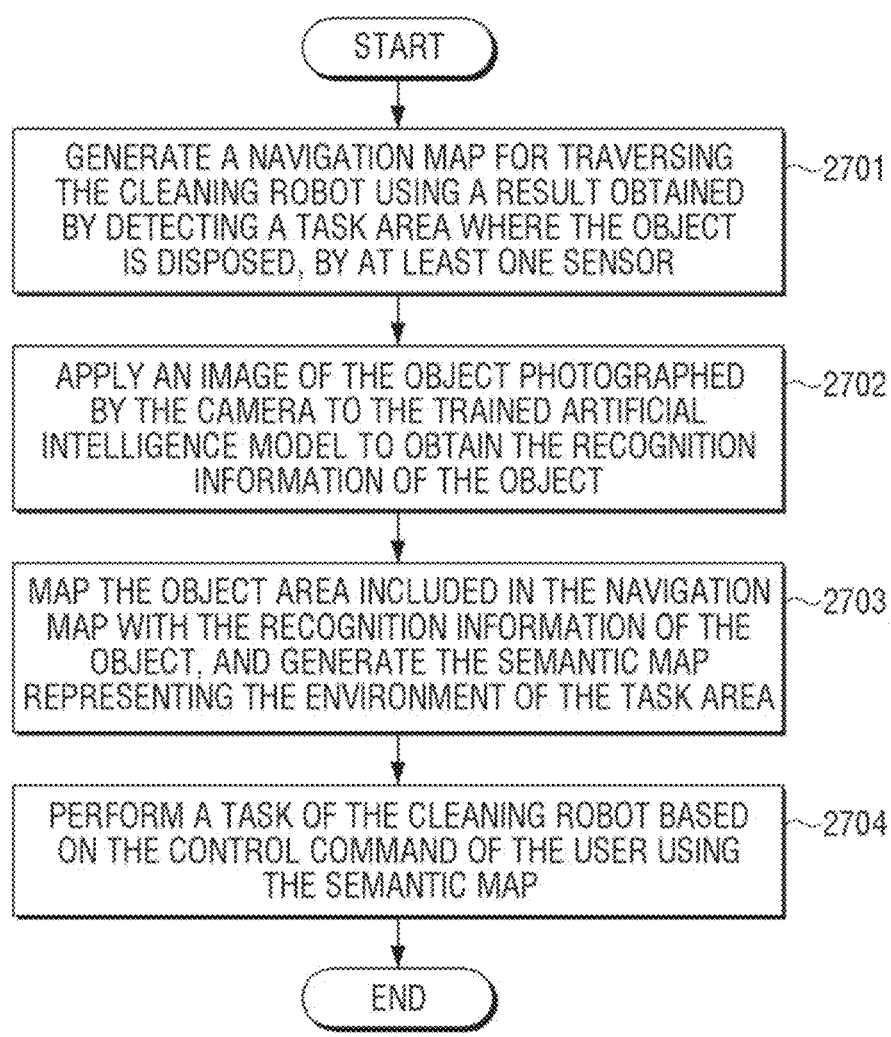
FIGS. 27 to 29 are flowcharts of the cleaning robot according to an embodiment.

FIG. 27 is a flowchart of the cleaning robot according to an embodiment.

Referring to FIG. 27, the cleaning robot 100 may generate a navigation map for traversing the cleaning robot 100 using a result obtained by detecting a task area where the object is disposed, by at least one sensor (2701).

The cleaning robot 100 may apply an image of the object photographed by the camera 120 to the trained artificial intelligence model to obtain the recognition information of the object (2702). The operation of obtaining the recognition information of the object may be performed prior to the operation of generating the navigation map by the cleaning robot 100 of operation 2701 and the recognition information of the object may be obtained in the process of generating the navigation map.

According to various embodiments, the cleaning robot 100 may obtain recognition information of the object by applying the image of the object photographed by the camera 120 to the trained artificial intelligence model located in an external server.

When the recognition information of the object is obtained, the cleaning robot 100 may map the object area included in the navigation map with the recognition information of the object, and may generate the semantic map representing the environment of the task area (2703).

The cleaning robot 100 may perform a task of the cleaning robot based on the control command of the user using the semantic map (2704). The user's control command may be a command for requesting execution of a task for an area of a specific object or a specific space.

According to various embodiments, the cleaning robot 100 may obtain recognition information of each place of the task area. The cleaning robot 100 may generate the semantic map representing the environment of the task area using the obtained recognition information of each space and mapped recognition information of the object.

According to the various embodiments, the cleaning robot 100 may generate the semantic map representing the environment of the task area by mapping the object area included in the navigation map with the recognition information of the object based on at least one of the position of the object or the type of the object, according to the result of detection of the object.

According to various embodiments, the cleaning robot 100 may identify a boundary of an object corresponding to the object in a navigation map. The cleaning robot 100 may map the object area determined by the boundary of the object and the recognition information of the object to generate a semantic map representing the environment of the task area.

According to various embodiments, among the plurality of sensors included in the sensing unit 110, the cleaning robot 100 may detect the object using at least one sensor based on the recognition information of the object. The cleaning robot 100 may obtain additional information about the object using the result obtained by detecting by at least one sensor.

According to various embodiments, the cleaning robot 100 may set a priority for a plurality of sensors according to recognition information of the object. The cleaning robot 100 may obtain additional information of the object using a result obtained by detecting by at least one sensor according to a priority among the plurality of sensors.

Figure 28:
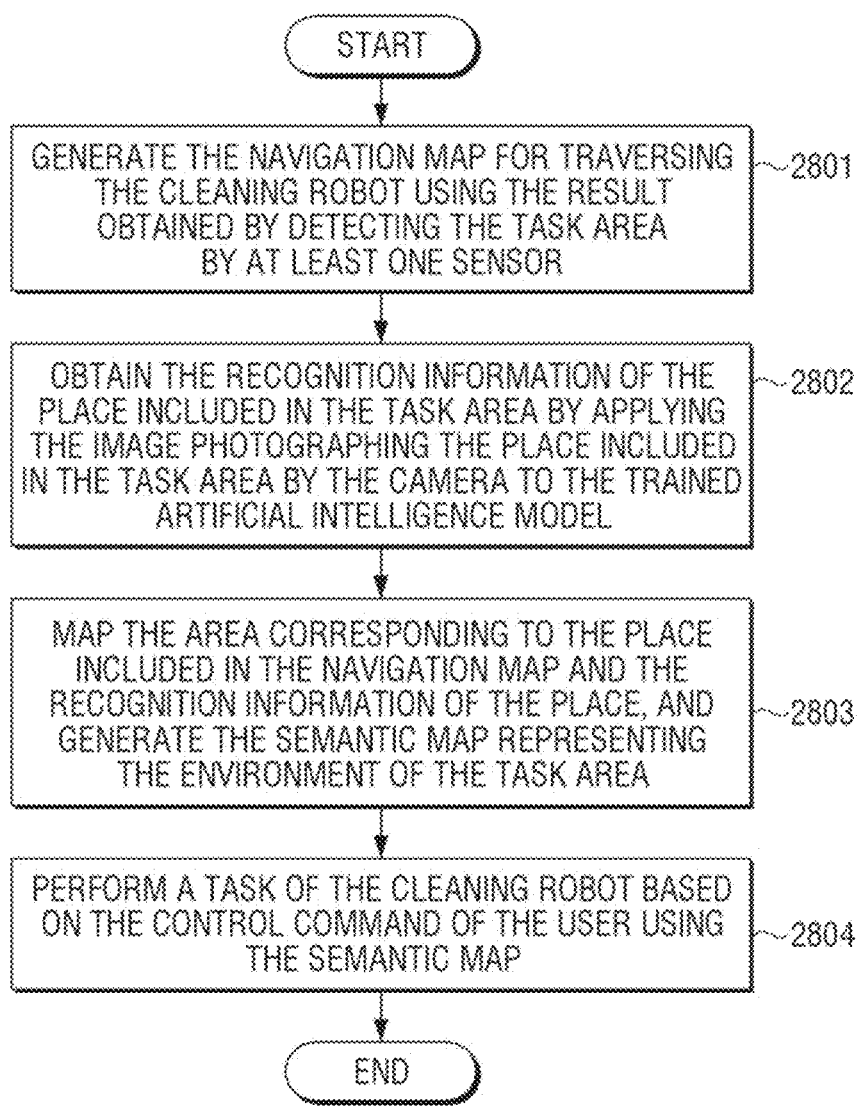

FIG. 28 is a flowchart of the cleaning robot according to an embodiment.

Referring to FIG. 28, the cleaning robot 100 may generate the navigation map for traversing the cleaning robot 100 using the result obtained by detecting the task area by at least one sensor (2801).

The cleaning robot 100 may obtain the recognition information of the place included in the task area by applying the image photographing the place included in the task area by the camera 120 to the trained artificial intelligence model (2802).

When the recognition information of the place included in the task area is obtained, the cleaning robot 100 may map the area corresponding to the place included in the navigation map and the recognition information of the place, and may generate the semantic map representing the environment of the task area (2803).

The cleaning robot 100 may perform a task of the cleaning robot 100 based on the control command of the user using the semantic map (2804).

Figure 29:
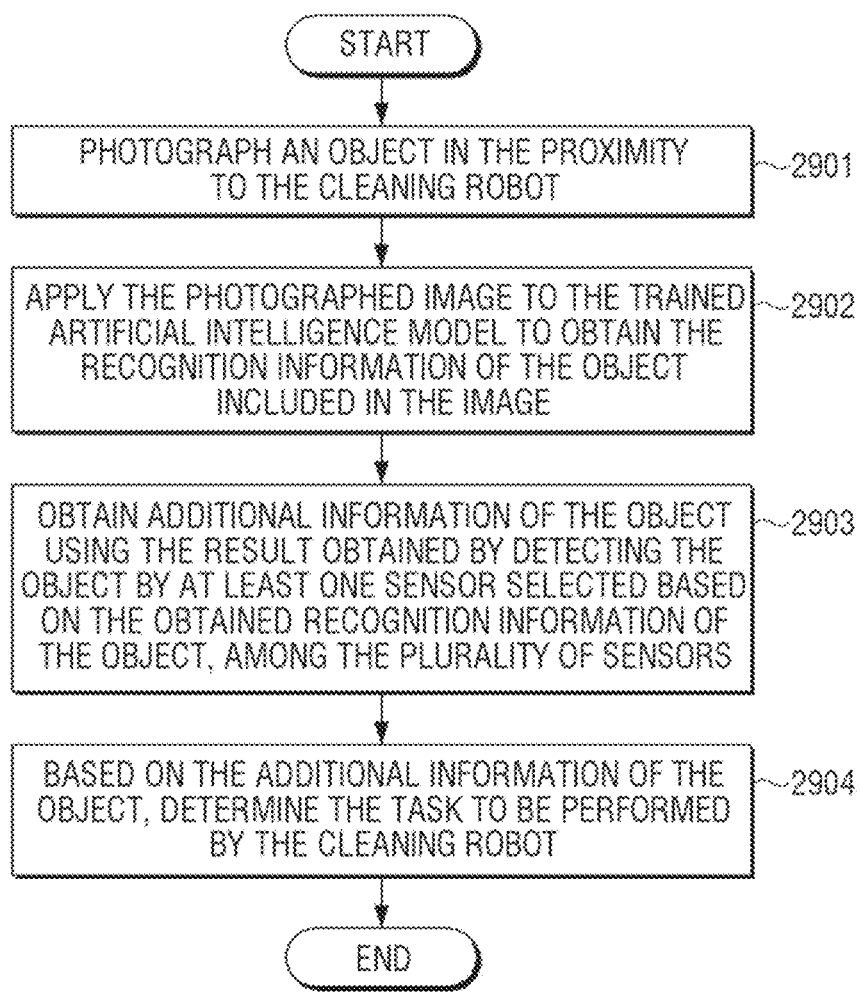

FIG. 29 is a flowchart of the cleaning robot according to an embodiment.

Referring to FIG. 29, the cleaning robot 100 may photograph an object in the proximity to the cleaning robot 100 (2901).

The cleaning robot 100 may apply the photographed image to the trained artificial intelligence model to obtain the recognition information of the object included in the image (2902). For example, the cleaning robot 100 may apply the photographed image to the trained artificial intelligence model located on the external server to obtain the recognition information of the object.

The cleaning robot 100 may obtain additional information of the object using the result obtained by detecting the object by at least one sensor selected based on the obtained recognition information of the object (2903).

For example, the cleaning robot 100 may obtain additional information on the object by selectively using only the detection result detected by at least one sensor selected based on the recognition information of the object, among the detection results detected by the plurality of sensors in a predetermined time (e.g., ten ms) based on the predetermined time point. At least one sensor selected based on the identification information of the object may be one or plural. When a plurality of sensors are selected based on the identification information of the object, the selected plurality of sensors may be prioritized. The cleaning robot 100 may add a weight to the detection result of the sensor having high priority to obtain additional information for the object.

According to various embodiments, when a priority is set to the IR stereo sensor to be high, among the plurality of sensors, the cleaning robot 100 may add a weight to the result of the IR stereo sensor to obtain additional information for the object. The cleaning robot 100 may identify a bounding box for the object and may detect the object by reducing the threshold of the IR stereo sensor for a region where the identification result of the bounding box and the object detection result through the IR stereo sensor do not match.

According to various embodiments, the cleaning robot 100 may set a priority to a plurality of sensors according to the identification information of the object, and may obtain additional information on the object using the result of sensing by least one sensor according to the priority among the plurality of sensors.

According to various embodiments, the cleaning robot 100 may obtain additional information for the object by adding a weight to the result detected by the LiDAR sensor, when a priority is set to high to the LiDAR sensor according to the recognition information of the object.

According to various embodiments, the cleaning robot 100 may obtain additional information on the object by adding a weight to the result obtained by detecting by the ultrasonic sensor when the priority to the ultrasound sensor is set to be high among the plurality of sensors according to the recognition information of the object. When a priority is set to be high to the ultrasonic sensor among the plurality of sensors according to the identification information of the object, the recognized object may be a transparent or black color object.

Based on the additional information of the object, the cleaning robot 100 may determine the task to be performed by the cleaning robot 100 (2904).

The various embodiments may be implemented in a mobile device. The mobile device may be According to various forms such as, for example, a service robot for a public place, a transfer robot in a production field, a worker support robot, a home robot, a security robot, or an auto driving vehicle, or the like.

The task of the disclosure may be a task according to the purpose of the mobile device. For example, if a task of a cleaning robot is a function of avoiding an object or inhaling dust in the house, a task of the worker support robot may be a function of avoiding an object or moving an object. The task of the security robot may be a function of avoiding an object, detecting an intruder to provide an alarm, or photographing an intruder. The task of the auto driving vehicle may be a function of avoiding other vehicles or obstacles, or controlling a steering device or acceleration/deceleration device.

The term "module" used in the disclosure includes units consisting of hardware, software, or firmware, and is used interchangeably with terms such as, for example, logic, logic blocks, parts, or circuits. A "unit" or "module" may be an integrally constructed component or a minimum unit or part thereof that performs one or more functions. For example, the module may be configured as an application-specific integrated circuit (ASIC).

Various embodiments of the disclosure may be implemented in software, including instructions stored on machine-readable storage media (e.g., the memory 130, a memory (not shown) of a server) readable by a machine (e.g., the cleaning robot 100, a server communicable with the cleaning robot 100 (not shown)). For example, a processor (e.g., the processor 140, a processor of a server (not shown) may call at least one instruction from one or more instructions stored in a storage medium and may execute the instructions. This enables the device to perform at least one function according to the at least one called instruction. The instructions may include a code generated by a compiler or a code executable by an interpreter. A machine-readable storage medium may be provided in the form of a non-transitory storage medium. Herein, the term "non-transitory" only denotes that a storage medium does not include a signal but is tangible, and does not distinguish the case in which a data is semi-permanently stored in a storage medium from the case in which a data is temporarily stored in a storage medium.

According to an embodiment, the method according to various embodiments disclosed herein may be provided in a computer program product. A computer program product may be exchanged between a seller and a purchaser as a commodity. A computer program product may be distributed in the form of a machine-readable storage medium (e.g., compact disc read only memory (CD-ROM)) or directly distributed online (e.g., download or upload) through an application store (e.g. PlayStore™) between two user devices (e.g., smartphones). In the case of on-line distribution, at least a portion of the computer program product may be stored temporarily or at least temporarily in a storage medium such as a manufacturer's server, a server of an application store, or a memory of a relay server.

According to various embodiments of the disclosure, the respective elements (e.g., module or program) of the elements mentioned above may include a single entity or a plurality of entities. According to the embodiments, at least one element or operation from among the corresponding elements mentioned above may be omitted, or at least one other element or operation may be added. Alternatively or additionally, a plurality of components (e.g., module or program) may be combined to form a single entity. In this case, the integrated entity may perform functions of at least one function of an element of each of the plurality of elements in the same manner as or in a similar manner to that performed by the corresponding element from among the plurality of elements before integration. The module, a program module, or operations executed by other elements according to variety of embodiments may be executed consecutively, in parallel, repeatedly, or heuristically, or at least some operations may be executed according to a different order, may be omitted, or the other operation may be added thereto.

What is claimed is:

1. A task performing method for a cleaning robot, the method comprising:
   obtaining a photographed image by photographing an object other than the cleaning robot and in proximity to the cleaning robot;
   obtaining recognition information of the object included in the photographed image, by identifying a bounding box for the object and applying the photographed image to a trained artificial intelligence model;
   setting a priority for at least one sensor of a plurality of sensors of the cleaning robot based on at least one characteristic of the object in the recognition information of the object;
   selecting at least one sensor from the plurality of sensors of the cleaning robot based on the priority for the at least one sensor;
   obtaining additional information of the object based on at least one detection result obtained by the at least one selected sensor, wherein the obtaining the additional information further comprises reducing a threshold value of the at least one sensor for an area in which an identification result of the bounding box and the at least one detection result do not match; and
   performing a task of the cleaning robot based on the additional information of the object.

2. The method of claim 1,
   wherein the at least one selected sensor comprises an infrared (IR) stereo sensor, and
   wherein, based on a priority of the IR stereo sensor being set to be high, the additional information of the object is obtained by adding a weight to the at least one detection result obtained by the IR stereo sensor.

3. The method of claim 2,
   wherein the reducing the threshold value of the at least one sensor further comprises reducing a threshold depth value of the IR stereo sensor.

4. The method of claim 1, wherein the at least one selected sensor comprises a light detection and ranging (LiDAR) sensor, and
   wherein, based on a priority of the LiDAR sensor being set to be high, the additional information of the object is obtained by adding a weight to the at least one detection result obtained by the LiDAR sensor.

5. The method of claim 1,
   wherein the at least one selected sensor comprises an ultrasonic sensor, and
   wherein, based on a priority of the ultrasonic sensor being set to be high, the additional information of the object is obtained by adding a weight to the at least one detection result obtained by the ultrasonic sensor.

6. The method of claim 5, wherein the priority of the ultrasonic sensor is set to be high based on the object being transparent or black in color.

7. The method of claim 1, wherein the trained artificial intelligence model is positioned in one of a memory of the cleaning robot or an external server.

8. The method of claim 1, wherein the plurality of sensors comprises at least one of an infrared (IR) stereo sensor, an ultrasonic sensor, a light detection and ranging (LiDAR) sensor, or a position sensitive detector (PSD) sensor.

9. The method of claim 1, wherein the at least one characteristic of the object in the recognition information of the object comprises at least one of a name of the object, a type of the object, a size of the object, or a feature of the object.

10. A cleaning robot comprising:
    a plurality of sensors;
    a camera; and
    at least one memory storing one or more instructions; and
    at least one processor configured to execute the one or more instructions,
    wherein the one or more instructions, when executed by the at least one processor, are configured to cause the cleaning robot to:
    obtain a photographed image by controlling the camera to photograph an object other than the cleaning robot and in proximity to the cleaning robot,
    obtain recognition information of the object included in the photographed image, by identifying a bounding box for the object and applying the photographed image to a trained artificial intelligence model,
    set a priority for at least one sensor of the plurality of sensors of the cleaning robot based on at least one characteristic of the object in the recognition information of the object,
    select at least one sensor from the plurality of sensors of the cleaning robot based on the priority for the at least one sensor,
    obtain additional information of the object based on at least one detection result obtained by the at least one selected sensor, and for an area of the photographed image in which an identification result of the bounding box and the at least one detection result do not match, obtain the additional information of the object by reducing a threshold depth value of the at least one selected sensor, and perform a task of the cleaning robot based on the additional information of the object.

11. The cleaning robot of claim 10, wherein the at least one selected sensor comprises an infrared (IR) stereo sensor, and wherein the one or more instructions, when executed by the at least one processor, are configured to cause the cleaning robot to:

based on a priority of the IR stereo sensor being set to be high, obtain the additional information of the object by adding a weight to the at least one detection result obtained by the IR stereo sensor.

12. The cleaning robot of claim 11, wherein the one or more instructions, when executed by the at least one processor, are configured to cause the cleaning robot to:

reduce the threshold value of the at least one selected sensor by reducing a threshold depth value of the IR stereo sensor.

13. The cleaning robot of claim 10, wherein the at least one selected sensor comprises a light detection and ranging (LiDAR) sensor, and wherein the one or more instructions, when executed by the at least one processor, are configured to cause the cleaning robot to:

based on a priority of the LiDAR sensor being set to be high, obtain the additional information of the object by adding a weight to the at least one detection result obtained by the LiDAR sensor.

14. A cleaning robot comprising:

an infrared (IR) stereo sensor;

a camera; and at least one memory storing one or more instructions; and at least one processor configured to execute the one or more instructions, wherein the one or more instructions, when executed by the at least one processor, are configured to cause the cleaning robot to:

obtain a photographed image, by controlling the camera to photograph an object in proximity to the cleaning robot, identify a bounding box for the object included in the photographed image, by applying the photographed image to a trained artificial intelligence model, obtain an IR detection result of the object, by detecting the object by the IR stereo sensor, for an area in which the bounding box for the object and the IR detection result of the object do not match, reduce a threshold depth value of the IR stereo sensor, and perform a task of the cleaning robot based on additional information of the object obtained by the IR stereo sensor.

* * * * *